United States Patent
Akita et al.

(10) Patent No.: US 9,470,161 B2
(45) Date of Patent: Oct. 18, 2016

(54) VAPORIZED FUEL PROCESSING APPARATUS

(71) Applicant: AISAN KOGYO KABUSHIKI KAISHA, Obu-shi, Aichi-ken (JP)

(72) Inventors: Minoru Akita, Ama (JP); Yoshikazu Miyabe, Nagoya (JP); Naoyuki Tagawa, Nagoya (JP)

(73) Assignee: AISAN KOGYO KABUSHIKI KAISHA, Obu-Shi, Aichi-Ken (JP)

(*) Notice: Subject to any disclaimer, the term of this patent is extended or adjusted under 35 U.S.C. 154(b) by 33 days.

(21) Appl. No.: 14/561,970

(22) Filed: Dec. 5, 2014

(65) Prior Publication Data

US 2015/0159567 A1   Jun. 11, 2015

(30) Foreign Application Priority Data

Dec. 6, 2013 (JP) ................... 2013-252873

(51) Int. Cl.
*F02M 25/08* (2006.01)
*F02D 41/00* (2006.01)
*F02D 41/14* (2006.01)
(Continued)

(52) U.S. Cl.
CPC ........... *F02D 41/003* (2013.01); *F02D 41/004* (2013.01); *F02D 41/1402* (2013.01); *F02D 41/221* (2013.01); *F02D 41/2451* (2013.01); *F02M 25/089* (2013.01); *F02M 25/0836* (2013.01); *F02D 2041/224* (2013.01);
(Continued)

(58) Field of Classification Search
CPC ............... Y10T 137/7761; Y10T 137/86485; F02M 25/0818; F02M 25/089; F02M 37/10

USPC ........... 137/487.5, 624.27; 123/519; 701/107
See application file for complete search history.

(56) References Cited

U.S. PATENT DOCUMENTS 5,269,277 A * 12/1993 Kuroda .............. F02M 25/0809
                                                 123/198 D
5,299,545 A *  4/1994 Kuroda ................. F02D 41/003
                                                 123/198 D
(Continued)

FOREIGN PATENT DOCUMENTS

DE        19838959 A1    3/2000
DE    102010014558 A1   10/2011
(Continued)

OTHER PUBLICATIONS

German Patent Application No. DE 10 2014 017 158.2 Office Action dated Jun. 16, 2015 (7 pages).

*Primary Examiner* — Matthew W Jellett
(74) *Attorney, Agent, or Firm* — Conley Rose, P.C.

(57) ABSTRACT

A vaporized fuel processing apparatus has a canister loaded with an adsorbent capable of adsorbing vaporized fuel generated in a fuel tank, a closing valve provided a vapor path connecting the canister and the fuel tank and having a valve seat and a valve movable portion such that a distance between the valve seat and the valve movable portion is stroke amount, a pressure sensor configured to detect inner pressure of the fuel tank, and an electric control unit. The electric control unit is configured to perform abnormal state depressurization control of the fuel tank, in a state that the pressure sensor cannot detect the inner pressure of the fuel tank, by setting the stroke amount of the closing valve at a fail-safe value in which the closing valve is closed, and then changing the stroke amount in a valve opening direction of the closing valve from the fail-safe value.

15 Claims, 20 Drawing Sheets

(51) Int. Cl.
*F02D 41/22* (2006.01)
*F02D 41/24* (2006.01)

(52) U.S. Cl.
CPC ........ *F02D2200/0602* (2013.01); *Y02T 10/40* (2013.01); *Y10T 137/86485* (2015.04)

(56) References Cited

U.S. PATENT DOCUMENTS

| | | | | |
|---|---|---|---|---|
| 5,355,864 | A * | 10/1994 | Kuroda | F02M 25/0809 123/198 D |
| 5,373,823 | A * | 12/1994 | Kuroda | F02M 25/0809 123/198 D |
| 6,523,398 | B1 * | 2/2003 | Hanai | F02M 25/0809 73/114.39 |
| 8,607,765 | B2 | 12/2013 | Hagen | |
| 2003/0226549 | A1 * | 12/2003 | Takagi | F02M 25/0818 123/520 |
| 2007/0186915 | A1 * | 8/2007 | Annoura | F02D 41/0042 123/698 |
| 2011/0296997 | A1 | 12/2011 | Sugiura | |
| 2012/0055452 | A1 * | 3/2012 | DeBastos | F02M 25/0818 123/521 |
| 2012/0097269 | A1 * | 4/2012 | Horiba | F02M 25/0854 137/551 |
| 2012/0211687 | A1 * | 8/2012 | Benjey | B60K 15/03519 251/248 |
| 2014/0102420 | A1 | 4/2014 | Kimoto et al. | |

FOREIGN PATENT DOCUMENTS

| | | |
|---|---|---|
| DE | 102013016984 A1 | 4/2014 |
| JP | 05-33729 A | 2/1993 |
| JP | 08-74678 A | 3/1996 |
| JP | 10-299583 A | 11/1998 |
| JP | 10-299586 A | 11/1998 |
| JP | 2004-156496 A | 6/2004 |
| JP | 2004-308483 A | 11/2004 |
| JP | 2005-155323 A | 6/2005 |
| JP | 2010-281258 A | 12/2010 |
| JP | 2011-256778 A | 12/2011 |
| JP | 2013-104316 A | 5/2013 |
| JP | 2013-113198 A | 6/2013 |

\* cited by examiner

| PURGE FLOW AMOUNT (L/sec) | TANK INNER PRESSURE (kPa) | | |
|---|---|---|---|
| | $P_{10}$ | $P_{11}$ | $P_{12}$ |
| 0 | 0 | 0 | 0 |
| L1 | α1 | α1 | α1 |
| L2 | α2 | α2 | α1 |
| L3 | α3 | α3 | α3 |
| L4 | α3 | α3 | α3 |

$L1 < L2 < L3 < L4$

VAPORIZED FUEL PROCESSING APPARATUS

CROSS-REFERENCE TO RELATED APPLICATIONS

This application claims priority to Japanese patent application serial number 2013-252873, filed Dec. 6, 2013, the contents of which are incorporated herein by reference in their entirety.

STATEMENT REGARDING FEDERALLY SPONSORED RESEARCH OR DEVELOPMENT

Not applicable.

BACKGROUND

This disclosure relates to a vaporized fuel processing apparatus including a canister equipped with an adsorbent capable of adsorbing vaporized fuel generated in a fuel tank, and a closing valve provided in a vapor path connecting the canister and the fuel tank to each other.

A pertinent conventional vaporized fuel processing apparatus is disclosed in Japanese Laid-Open Patent Publication No. 2013-113198. The vaporized fuel processing apparatus according to Japanese Laid-Open Patent Publication No. 2013-113198 is equipped with a canister housing an adsorbent capable of adsorbing vaporized fuel generated in a fuel tank, a closing valve provided in a vapor path connecting the canister and the fuel tank to each other, and a purge path connecting the canister and an intake path of an internal combustion engine (engine). In the vaporized fuel processing apparatus, when the engine is started and a predetermined purge condition holds good, negative pressure generated in the engine acts on the interior of the canister via the purge path in a state where the interior of the canister is open to the atmosphere. As a result, air flows into the canister such that the vaporized fuel adsorbed on the adsorbent is purged and then the purged vaporized fuel is guided to the engine via the purge path. Further, during such purge operation of the canister, the closing valve in the vapor path is opened to perform depressurization control of the fuel tank. In the depressurization control of the fuel tank, a valve opening duty of the closing valve is set based on the inner pressure of the fuel tank (tank inner pressure) and the amount of gas flowing through the purge path (purge flow amount).

In the vaporized fuel processing apparatus, if a tank inner pressure sensor functions abnormally (e.g., failure), the valve opening duty of the closing valve cannot be set, and the depressurization control of the fuel tank is not possible. Accordingly, there has been a need for improved vaporized fuel processing apparatuses.

BRIEF SUMMARY

In one aspect of this disclosure, a vaporized fuel processing apparatus has a canister loaded with an adsorbent capable of adsorbing vaporized fuel generated in a fuel tank, a vapor path connecting the canister and the fuel tank to each other, a closing valve provided in the vapor path and having a valve seat and a valve movable portion, a pressure sensor configured to detect inner pressure of the fuel tank, and an electric control unit. The valve movable portion has an axis and is capable of moving in an axial direction of the valve movable portion respect to the valve seat. The electric control unit is configured to perform depressurization control of the fuel tank by adjusting the amount of gas flowing through the vapor path through changing of the stroke amount which is an axial distance of the valve movable portion with respect to the valve seat depending on the inner pressure of the fuel tank. The electric control unit is configured to perform abnormal state depressurization control of the fuel tank, in a state that the pressure sensor cannot detect the inner pressure of the fuel tank, by setting the stroke amount of the closing valve at a fail-safe value in which the closing valve is closed, and then changing the stroke amount in a valve opening direction of the closing valve from the fail-safe value.

According to the aspect of this disclosure, when the inner pressure of the fuel tank cannot be detected, the stroke amount of the closing valve is set at the fail-safe value in which the closing valve is closed, and then the stroke amount is changed in the valve opening direction of the closing valve from the fail-safe value in order to perform the abnormal state depressurization control. Accordingly, if the inner pressure of the fuel tank cannot be detected, the depressurization of the fuel tank can be performed.

BRIEF DESCRIPTION OF THE DRAWINGS

FIG. 6 is a map illustrating appropriate stroke amounts (standard stroke amount) (0-α10 steps) of the closing valve corresponding to the purge flow amount (L/sec) and the tank inner pressure (kPa);

DETAILED DESCRIPTION

Each of the additional features and teachings disclosed above and below may be utilized separately or in conjunction with other features and teachings to provide improved vaporized fuel processing apparatuses. Representative examples, which utilize many of these additional features and teachings both separately and in conjunction with one another, will now be described in detail with reference to the attached drawings. This detailed description is merely intended to teach a person of skilled in the art further details for practicing preferred aspects of the present teachings and is not intended to limit the scope of the invention. Only the claims define the scope of the claimed invention. Therefore, combinations of features and steps disclosed in the following detailed description may not be necessary in the broadest sense, and are instead taught merely to particularly describe representative examples. Moreover, various features of the representative examples and the dependent claims may be combined in ways that are not specifically enumerated in order to provide additional useful embodiments of the present teachings.

Figure 1:
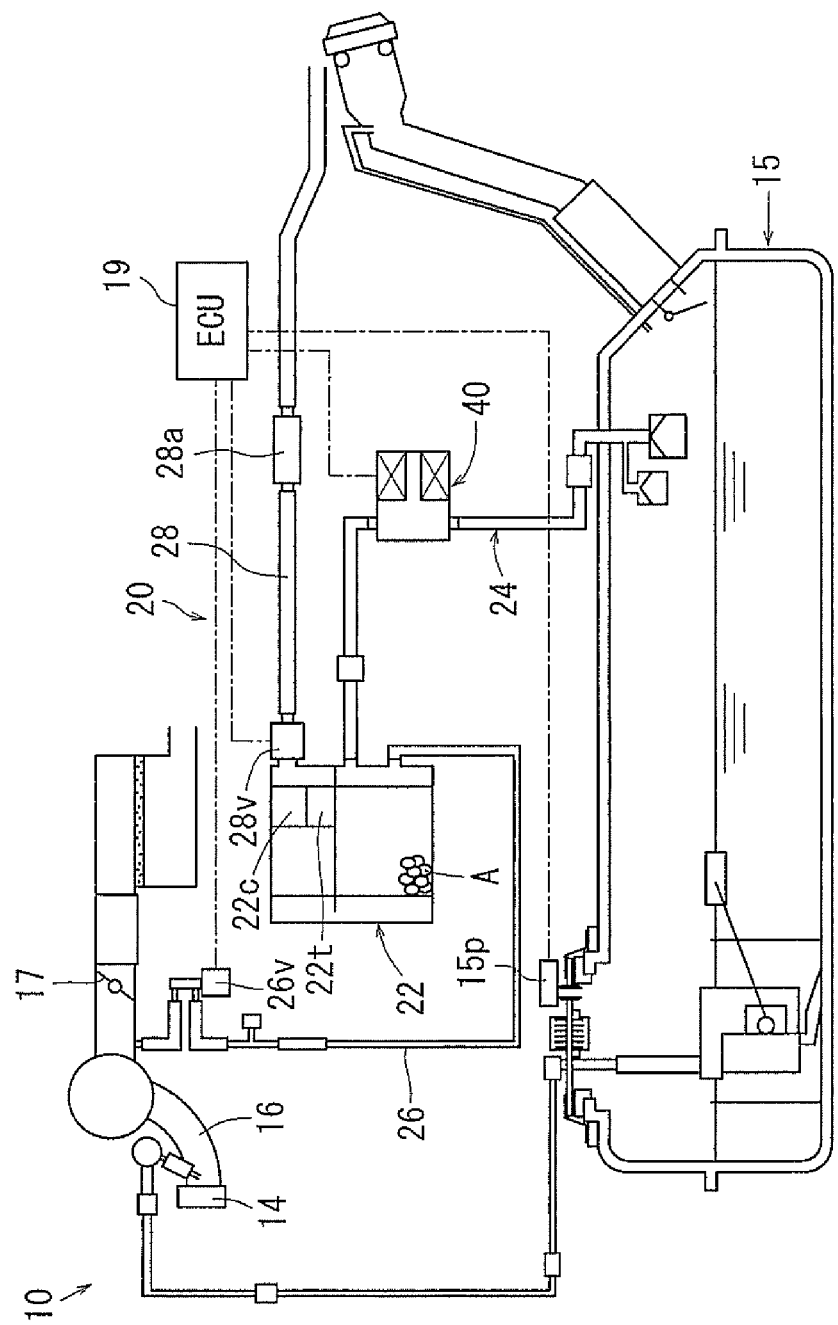
FIG. 1 is a diagram illustrating the construction of a vaporized fuel processing apparatus according to a first embodiment of this disclosure.

A vaporized fuel processing apparatus 20 according to a first embodiment of this disclosure will be described with reference to FIGS. 1 through 4. As shown in FIG. 1, the vaporized fuel processing apparatus 20 of the present embodiment is provided in a vehicle engine system 10 and is configured to prevent leakage of vaporized fuel from a fuel tank 15 of the vehicle to the exterior.

As shown in FIG. 1, the vaporized fuel processing apparatus 20 is equipped with a canister 22, a vapor path 24 connected to the canister 22, a purge path 26, and an atmosphere path 28. The canister 22 is loaded with activated carbon as the adsorbent A, and vaporized fuel which has been generated in the fuel tank 15 is adsorbed by the adsorbent A. One end portion (upstream side end portion) of the vapor path 24 communicates with a gaseous layer portion in the fuel tank 15, and the other end portion (downstream side end portion) of the vapor path 24 communicates with the interior of the canister 22. At some midpoint of the vapor path 24, there is provided a closing valve 40 (described below) configured to allow/prohibit communication through the vapor path 24. One end portion (upstream side end portion) of the purge path 26 communicates with the interior of the canister 22, and the other end portion (downstream side end portion) of the purge path 26 communicates with the path portion on the downstream side of a throttle valve 17 in an intake path 16 of an engine 14.

At some midpoint of the purge path 26, there is provided a purge valve 26v configured to allow/prohibit communication through the purge path 26. Further, the canister 22 communicates with the atmosphere path 28 via an on-board diagnostics (OBD) component 28v for failure detection. At some midpoint of the atmosphere path 28, there is provided an air filter 28a, and the other end portion of the atmosphere path 28 is open to the atmosphere. The closing valve 40, the purge valve 26v, and the OBD component 28v are controlled based on signals from an electric control unit (ECU) 19. Further, signals from a tank inner pressure sensor 15p for detecting the pressure in the fuel tank 15, etc. are input to the ECU 19.

Next, the basic operation of the vaporized fuel processing apparatus 20 will be described. While the vehicle is at rest, the closing valve 40 is maintained in the closed state. Thus, no vaporized fuel flows into the canister 22 from the fuel tank 15. When an ignition switch of the vehicle is turned on while the vehicle is at rest, there is performed learning control in which the valve opening start position for the closing valve 40 is learned. Further, while the vehicle is at rest, the purge valve 26v is maintained in the closed state, and the purge path 26 is in the cut-off state, with the atmosphere path 28 being maintained in the communication state. While the vehicle is traveling, when a predetermined purge condition holds good, the ECU 19 performs a control operation for purging the vaporized fuel adsorbed in the canister 22. In this control operation, opening/closing control is performed on the purge valve 26v while allowing the canister 22 to communicate with the atmosphere via the atmosphere path 28. When the purge valve 26v is opened, the intake negative pressure of the engine 14 acts on the interior of the canister 22 via the purge path 26. As a result, air flows into the canister 22 via the atmosphere path 28. Further, when the purge valve 26v is opened, the closing valve 40 operates in the valve opening direction to perform depressurization control of the fuel tank 15 (described below). Thus, the gas flows into the canister 22 from the fuel tank 15 via the vapor path 24. As a result, the adsorbent A in the canister 22 is purged by the air, etc. flowing into the canister 22, and the vaporized fuel separated from the adsorbent A is guided to the intake path 16 of the engine 14 together with the air before being burned in the engine 14.

Figure 2:
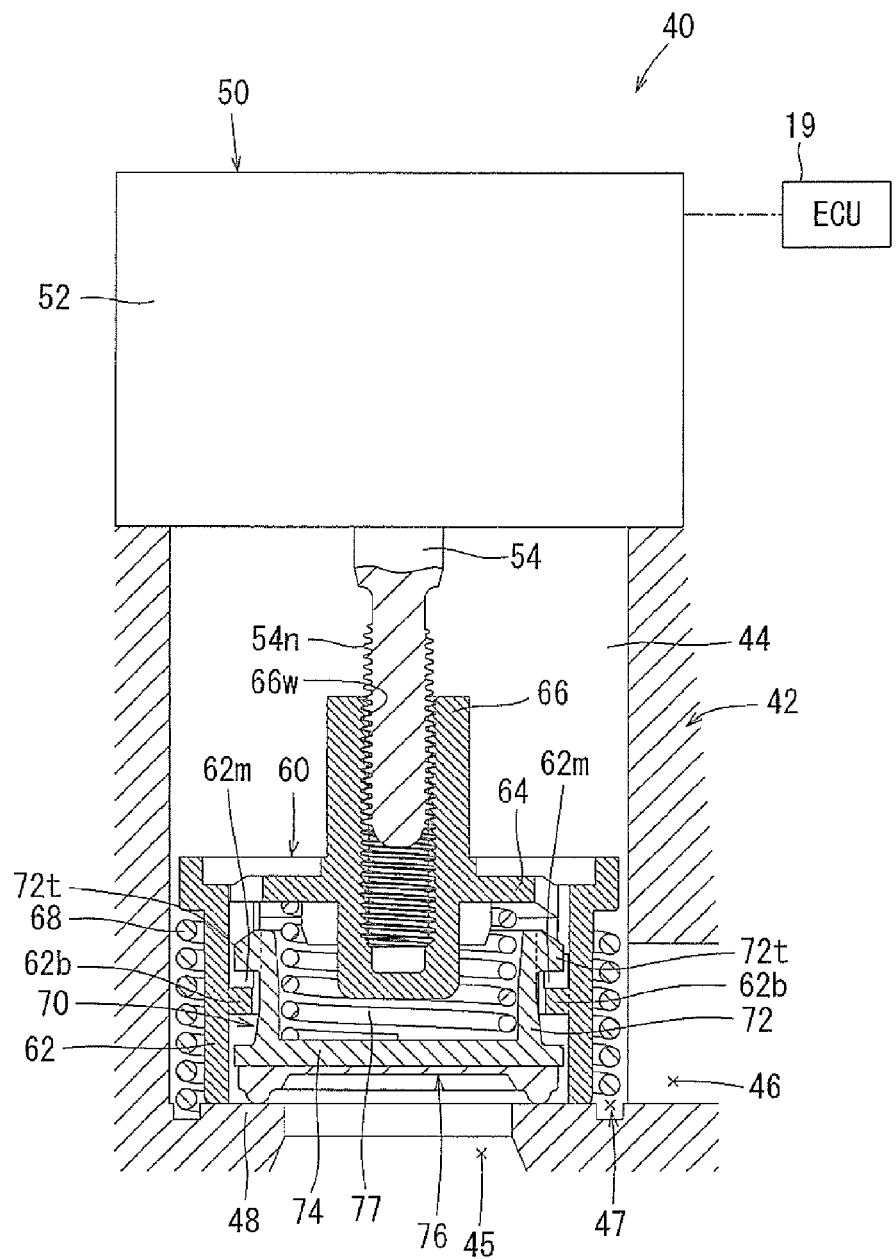
FIG. 2 is a longitudinal sectional view illustrating an initialization state of a closing valve used in the vaporized fuel processing apparatus.

The closing valve 40 is a flow rate control valve configured to close the vapor path 24 in the closed state, and to control the flow rate of the gas flowing through the vapor path 24 in the open state. As shown in FIG. 2, the closing valve 40 is equipped with a valve casing 42, a stepping motor 50, a valve guide 60, and a valve body 70. In the valve casing 42, there is formed a continuous, reverse L-shaped fluid passage 47 by a valve chamber 44, an inflow path 45, and an outflow path 46. A valve seat 48 is formed concentrically on the lower surface of the valve chamber 44, that is, at the port edge portion of the upper end opening of the inflow path 45. The stepping motor 50 is installed on top of the valve casing 42. The stepping motor 50 has a motor main body 52, and an output shaft 54 protruding from a lower surface of the motor main body 52 and capable of normal and reverse rotation. The output shaft 54 is concentrically arranged within the valve chamber 44 of the valve casing 42, and a male screw portion 54n is formed on the outer peripheral surface of the output shaft 54.

The valve guide 60 is formed as a topped cylinder by a cylindrical tubular wall portion 62 and an upper wall portion 64 closing the upper end opening of the tubular wall portion 62. At the central portion of the upper wall portion 64, there is concentrically formed a tubular shaft portion 66, and a female screw portion 66w is formed on the inner peripheral surface of the tubular shaft portion 66. The valve guide 60 is arranged so as to be movable in the axial direction (vertical direction) while prohibited from rotating around the axis by a detent means (not shown). The male screw portion 54n of the output shaft 54 of the stepping motor 50 is threadedly engaged with the female screw portion 66w of the tubular shaft portion 66 of the valve guide 60 such that the valve guide 60 can be raised and lowered in the vertical direction (axial direction) based on the normal and reverse rotation of the output shaft 54 of the stepping motor 50. Around the valve guide 60, there is provided an auxiliary spring 68 urging the valve guide 60 upwardly.

The valve body 70 is formed as a bottomed cylinder composed of a cylindrical tubular wall portion 72 and a lower wall portion 74 closing the lower end opening of the tubular wall portion 72. A seal member 76 consisting, for example, of a disc-like member formed of a rubber-like elastic material is attached to a lower surface of the lower wall portion 74. The valve body 70 is concentrically arranged within the valve guide 60, and the seal member 76 of the valve body 70 is arranged so as to be capable of abutting an upper surface of the valve seat 48 of the valve casing 42. A plurality of connection protrusions 72t are circumferentially formed on the outer peripheral surface of the upper end portion of the tubular wall portion 72 of the valve body 70. The connection protrusions 72t of the valve body 70 are engaged with vertical-groove-like connection recesses 62m formed in the inner peripheral surface of the tubular wall portion 62 of the valve guide 60 so as to be capable of relative movement in the vertical direction by a fixed dimension. The valve guide 60 and the valve body 70 are integrally movable upwards (in the valve opening direction), with bottom wall portions 62b of the connection recesses 62m of the valve guide 60 abutting the connection protrusions 72t of the valve body 70 from below. Further, a valve spring 77 constantly urging the valve body 70 downwards, i.e., in the valve closing direction, with respect to the valve guide 60, is concentrically arranged between the upper wall portion 64 of the valve guide 60 and the lower wall portion 74 of the valve body 70.

Next, the basic operation of the closing valve 40 will be described. The closing valve 40 rotates the stepping motor 50 in the valve opening direction or in the valve closing direction by a predetermined number of steps based on an output signal from the ECU 19. When the stepping motor 50 rotates by the predetermined steps, the valve guide 60 moves by a predetermined stroke amount or distance in the vertical direction through threaded engagement action between the male screw portion 54n of the output shaft 54 of the stepping motor 50 and the female screw portion 66w of the tubular shaft portion 66 of the valve guide 60. In the above closing valve 40, setting is made, for example, such that, at the totally open position, the number of steps is approximately 200 and the stroke amount is approximately 5 mm. As shown in FIG. 2, in the initialized state (initial state) of the closing valve 40, the valve guide 60 is retained at the lower limit position, and the lower end surface of the tubular wall portion 62 of the valve guide 60 is in contact with the upper surface of the valve seat 48 of the valve casing 42. In this state, the connection protrusions 72t of the valve body 70 are situated above the bottom wall portions 62b of the connection recesses 62m of the valve guide 60, and the seal member 76 of the valve body 70 is pressed against the upper surface of the valve seat 48 of the valve casing 42 by the resilient force of the valve spring 77. That is, the closing valve 40 is maintained in the totally closed state. The number of steps of the stepping motor 50 at this time is zero (0), and the moving amount in the axial direction (upper direction) of the valve guide 60, i.e., the stroke amount in the valve opening direction, is zero (0) mm. While the vehicle is, for example, at rest, the stepping motor 50 of the closing valve 40 rotates, for example, by 4 steps in the valve opening direction from the initialized state. As a result, the valve guide 60 moves approximately 0.1 mm upwards due to the threaded engagement action between the male screw portion 54n of the output shaft 54 of the stepping motor 50 and the female screw portion 66w of the tubular shaft portion 66 of the valve guide 60, and is maintained in a state in which it is raised from the valve seat 48 of the valve casing 42. As a result, an excessive force is not easily applied between the valve guide 60 of the closing valve 40 and the valve seat 48 of the valve casing 42 due to a change in an environment factor such as temperature. In this state, the seal member 76 of the valve body 70 is pressed against the upper surface of the valve seat 48 of the valve casing 42 due to the resilient force of the valve spring 77.

Figure 3:
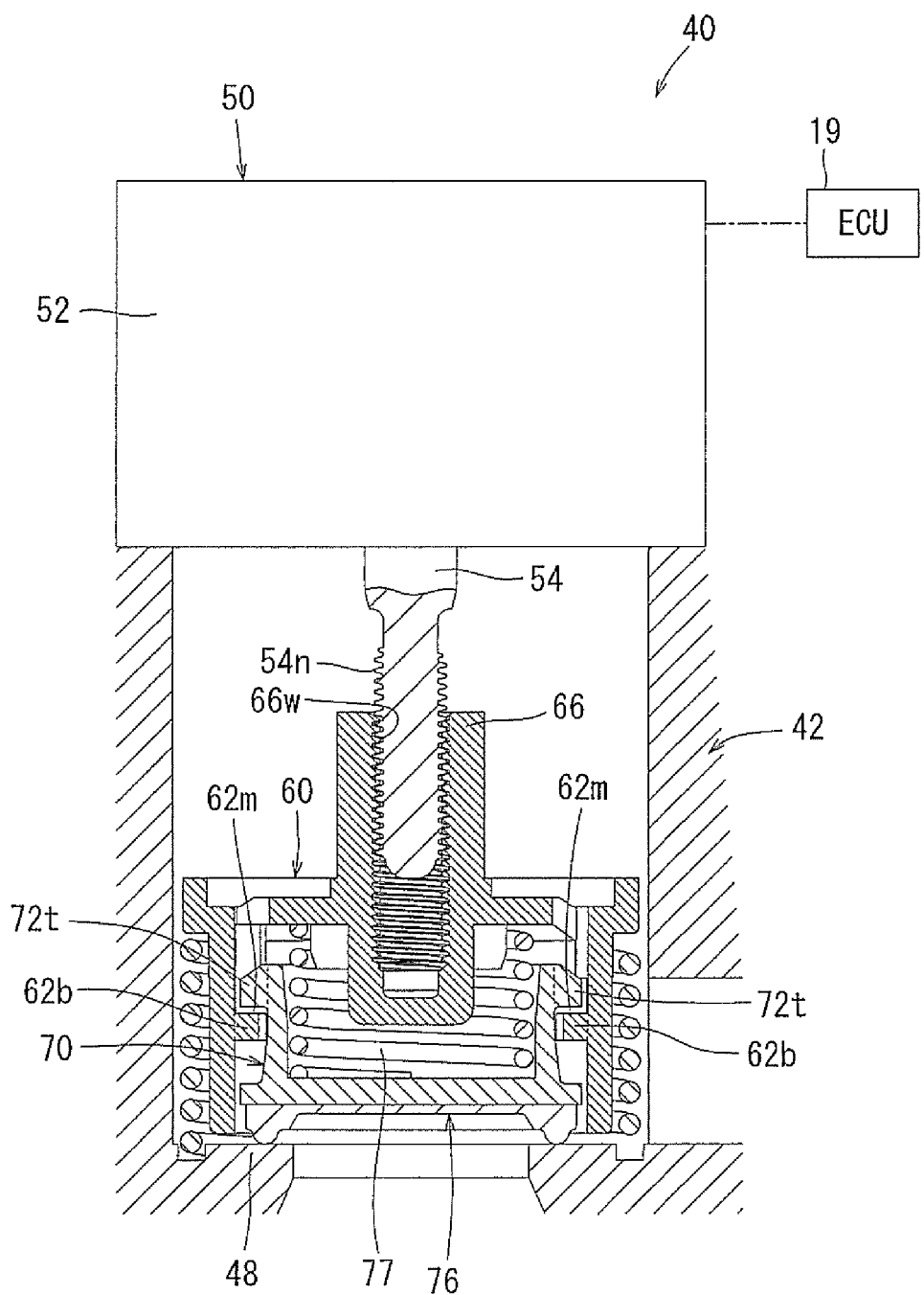
FIG. 3 is a longitudinal sectional view illustrating the valve closing state of the closing valve.
Figure 4:
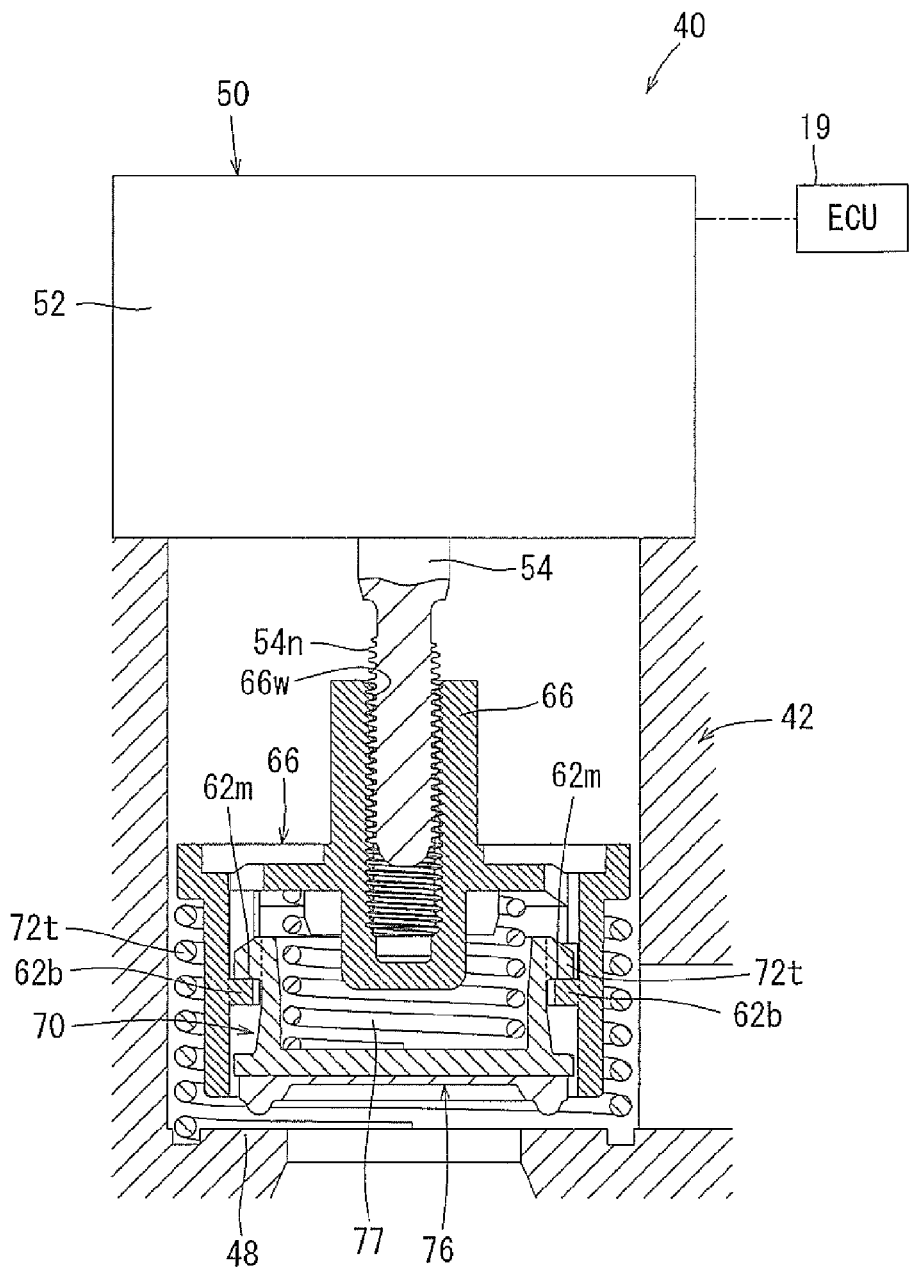
FIG. 4 is a longitudinal sectional view illustrating the valve opening state of the closing valve.

When the stepping motor 50 further rotates in the valve opening direction from the position to which the stepping motor 50 has rotated by 4 steps, the valve guide 60 moves upwards due to the threaded engagement action between the male screw portion 54n and the female screw portion 66w and, as shown in FIG. 3, the bottom wall portions 62b of the connection recesses 62m of the valve guide 60 abut the connection protrusions 72t of the valve body 70 from below. As shown in FIG. 4, when the valve guide 60 moves further upwards, the valve body 70 moves upwards together with the valve guide 60, and the seal member 76 of the valve body 70 is separated from the valve seat 48 of the valve casing 42. As a result, the closing valve 40 is opened. Here, the valve opening start position for the closing valve 40 differs from product to product depending upon the positional tolerance of the connection protrusions 72t formed on the valve body 70, and the positional tolerance of the bottom wall portions 62b formed on the connection recesses 62m of the valve guide 60, etc., so that it is necessary to correctly learn the valve opening start position. This learning is performed through the learning control, and the number of steps of the valve opening start position is detected based on the timing with which the inner pressure of the fuel tank 15 is reduced by not less than (i.e., greater than or equal to) a predetermined value while rotating the stepping motor 50 of the closing valve 40 in the valve opening direction (while increasing the number of steps). Here, because change of the number of steps of the stepping motor 50 shows the stroke amount (travel distance in the axial direction) of the valve guide 60 and the valve body 70, the terms of the number of steps and the stroke amount will be used as synonyms.

Figure 5:
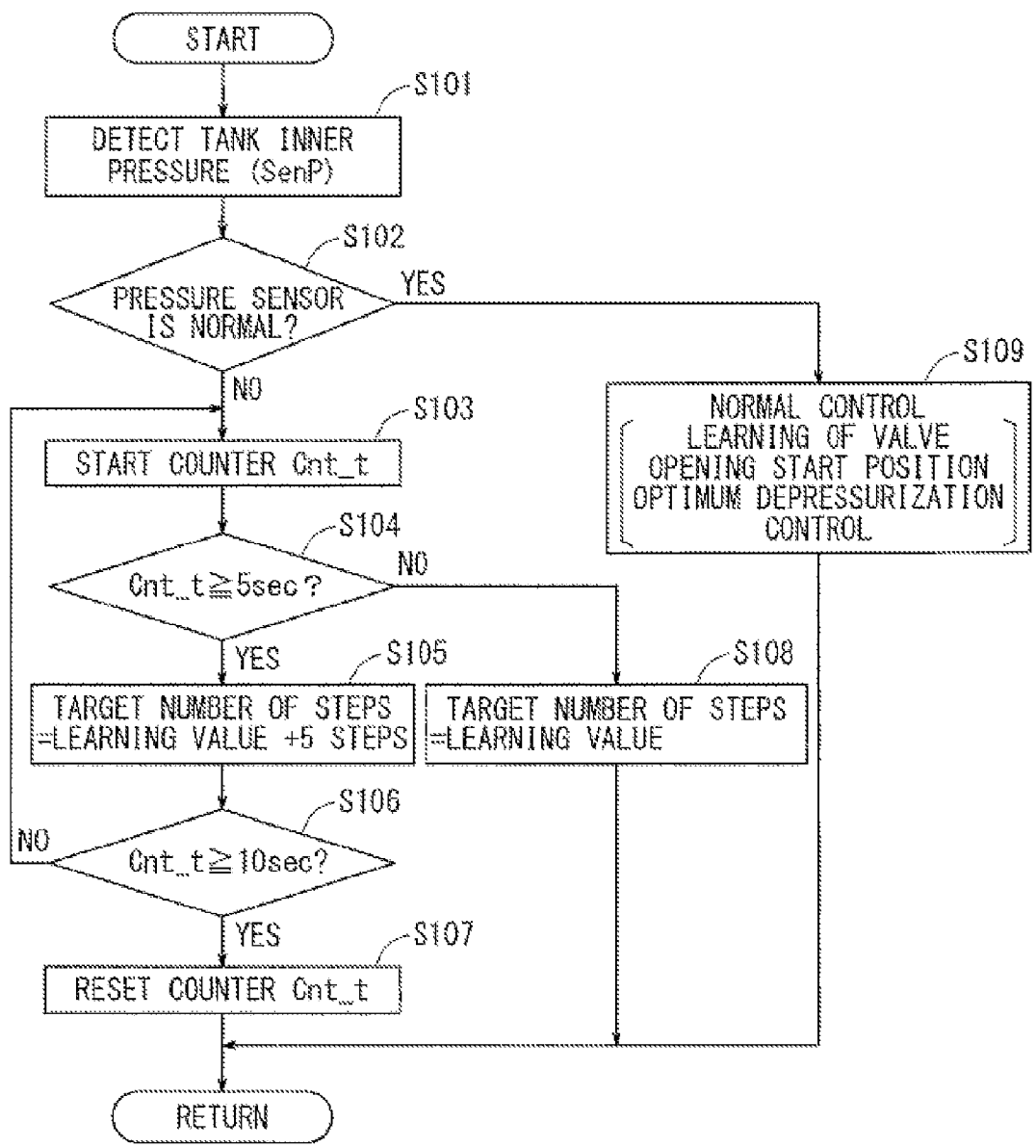
FIG. 5 is a flowchart illustrating the depressurization control of the fuel tank and the depressurization control in a pressure sensor abnormal state (abnormal state depressurization control)

Next, the depressurization control and the abnormal state depressurization control of the fuel tank 15 by using the closing valve 40 will be described with reference to FIGS. 5-7. While the vehicle is traveling, when the ECU 19 performs the control for purging the vaporized fuel in the canister 22, the depressurization control of the fuel tank 15 is simultaneously performed. That is, the closing valve 40 in the vapor path 24 is opened in time with opening of the purge valve 26v in the purge path 26 in order to perform the depressurization control of the fuel tank 15. The operation shown in the flowchart of FIG. 5 is repeatedly performed at the predetermined intervals based on a program stored in a storage unit of the ECU 19. First, the inner pressure of the fuel tank 15 (tank inner pressure SenP) is detected at step S101 of FIG. 5, and then it is determined whether the tank inner pressure sensor 15p is normal or not at step S102. The determination whether the tank inner pressure sensor 15*p* is normal or not is performed based on a sensor fail flag of the ECU 19 (refer to the upper portion of FIG. 7). When the tank inner pressure sensor 15*p* is normal (sensor fail flag is OFF; step S102 is YES), a normal control is performed at step S109. In the normal control, the learning control for determining the number of steps of the valve opening start position of the closing valve 40 is performed at the beginning. That is, while rotating the stepping motor 50 of the closing valve 40 in the valve opening direction (increasing the number of steps), the number of steps at the valve opening start position (learning value) is determined based on the time when the inner pressure of the fuel tank 15 decreases by not less than (i.e., greater than or equal to) a predetermined value. Then, the depressurization control of the fuel tank 15 is performed.

In the depressurization control of the fuel tank 15, the closing valve 40 is opened based on the appropriate stroke amount (standard stroke amount) shown in the map of FIG. 6. In the map of FIG. 6, the standard stroke amounts of the closing valve 40 ($\alpha 1$ through $\alpha 10$ steps, $\alpha 1 < \alpha 2 < \ldots < \alpha 10$) each corresponding to the tank inner pressure P (0 through $P_{10}$, $P_{11}$, and $P_{12}$ (kPa)) and the purge flow amount (0, L1, L2, L3 and L4 (L/sec)) are set. The tank inner pressures from 0 (kPa) to $P_{12}$ (kPa) are divided at the predetermined pressure intervals, and the range of the inner pressure between 0 (kPa) and P12 (kPa) is not shown in FIG. 6. Here, the relationship between each tank inner pressure is $0 < \ldots < P_{10} < P_{11} < P_{12}$. The purge flow amounts between 0 (L/sec) and L4 (L/sec) are divided at predetermined flow amount intervals such that the relationship between each purge flow amount is 0<L1<L2<L3<L4. Each of the standard stroke amounts ($\alpha 1$ through $\alpha 10$ step) shown in FIG. 6 is the number of steps based on 0 step at the valve opening start position of the closing valve 40 (learning value). In a state that the closing valve 40 is opened at the standard stroke amount (step), the flow amount through the closing valve 40 (depressurization flow amount L/sec) is set to be less than the purge flow amount (L/sec).

For example, when the tank inner pressure P is $P_{10}$ (kPa) and the purge flow amount calculated by the ECU 19 is L3 (L/sec), the standard stroke amount of the closing valve 40 is set as $\alpha 3$ step as shown by a reference symbol M in FIG. 6. When the closing valve 40 is opened by the standard stroke amount ($\alpha 3$ step), gas in the depressurization flow amount (L/sec) corresponding to the standard stroke amount ($\alpha 3$ step) flows through the closing valve 40 and the vapor path 24 toward the canister 22, resulting in depressurization of the fuel tank 15. In this state, because the depressurization flow amount (L/sec) corresponding to the standard stroke amount ($\alpha 3$ step) is not larger than (i.e., less than or equal to) the purge flow amount L3 (L/sec), the vaporized fuel flowing into the canister 22 from the fuel tank 15 through the vapor path 24 does not remain in the canister 22 but is guided to the engine 14 through the purge path 26 and the purge valve 26*v*. Further, the vaporized fuel does not leak into the atmosphere from the canister 22. When, for example, the tank inner pressure P is $P_{10}$ (kPa) and the purge flow amount calculated by the ECU 19 is L2 (L/sec), the standard stroke amount of the closing valve 40 is set as $\alpha 2$ step (<$\alpha 3$ step) as shown by a reference symbol N in FIG. 6. When the stroke amount of the closing valve 40 is $\alpha 2$ step, gas in the depressurization flow amount (L/sec) corresponding to the standard stroke amount ($\alpha 2$ step) flows through the closing valve 40 and the vapor path 24 toward the canister 22, resulting in the depressurization of the fuel tank 15. Here, in this state, the flow amount through the closing valve 40 (depressurization amount (L/sec)) is not higher than (i.e., less than or equal to) the purge flow amount L2 (L/sec).

Next, the abnormal depressurization control in a state that the tank inner pressure sensor 15*p* is determined to be abnormal at step S102 of the flowchart in FIG. 5 will be described. As shown in FIG. 7, when the sensor fail flag is turned on such that an abnormality of the tank inner pressure sensor 15*p* is detected (refer to time Tx1 in FIG. 7), step S102 in the flowchart of FIG. 5 is NO, and a counter Cnt is started at step S103. At time Tx1 in FIG. 7, because a count value t of the counter Cnt is less than 5 seconds (step S104 is NO), the target number of steps showing the stroke amount of the closing valve 40 is set to be equal to the learning value at step S108. The learning value is a learning value determined in a state that the tank inner pressure sensor 15*p* is in a normal condition. In this way, because the target number of steps of the closing valve 40 is set to be equal to the learning value (valve opening start position), the closing valve 40 is maintained in the valve closing state such that the closing valve 40 is ready to be quickly opened. The operation of steps S101-S104 and S108 shown in FIG. 5 is repeatedly performed such that the target number of steps of the closing valve 40 is kept to be the learning value and the closing valve 40 is maintained in the valve closing state. When the count value t of the counter Cnt is equal to or higher than 5 seconds (refer to time Tx2 in FIG. 7; step S104 in FIG. 5 is YES), the target number of steps of the closing valve 40 is set to be the learning value+5 steps (step S105 in FIG. 5). Thus, the closing valve 40 is moved in the valve opening direction by 5 steps from the valve opening start position (the learning value) in order to open the flow path, resulting in the depressurization of the fuel tank 15.

Then, at step S106 in FIG. 5, it is determined whether the count value t of the counter Cnt is higher than 10 seconds or not. At time Tx2 in FIG. 7, because the count value t of the counter Cnt is not higher than 10 seconds (step S106 is NO), the operation is returned to step S103. And, the operation of steps S103-S106 is repeatedly performed. That is, the depressurization of the fuel tank 15 is performed in the state that the closing valve 40 is opened by 5 steps from the valve opening start position (the learning value). Then, when the count value t of the counter Cnt is equal to or higher than 10 seconds (refer to time Tx3 in FIG. 7; step S106 in FIG. 5 is YES), the count value t of the counter Cnt is reset (step S107), and the operation is returned to step S101. In this way, when the abnormality of the tank inner pressure sensor 15*p* is detected, opening and closing of the closing valve 40 are alternately repeated at intervals of 5 seconds in order to intermittently perform the depressurization of the fuel tank 15. That is, the valve opening start position (the learning value) of the closing valve 40 corresponds to a fail-safe value of this disclosure, and 5 steps corresponds to a predetermined value of this disclosure.

Figure 7:
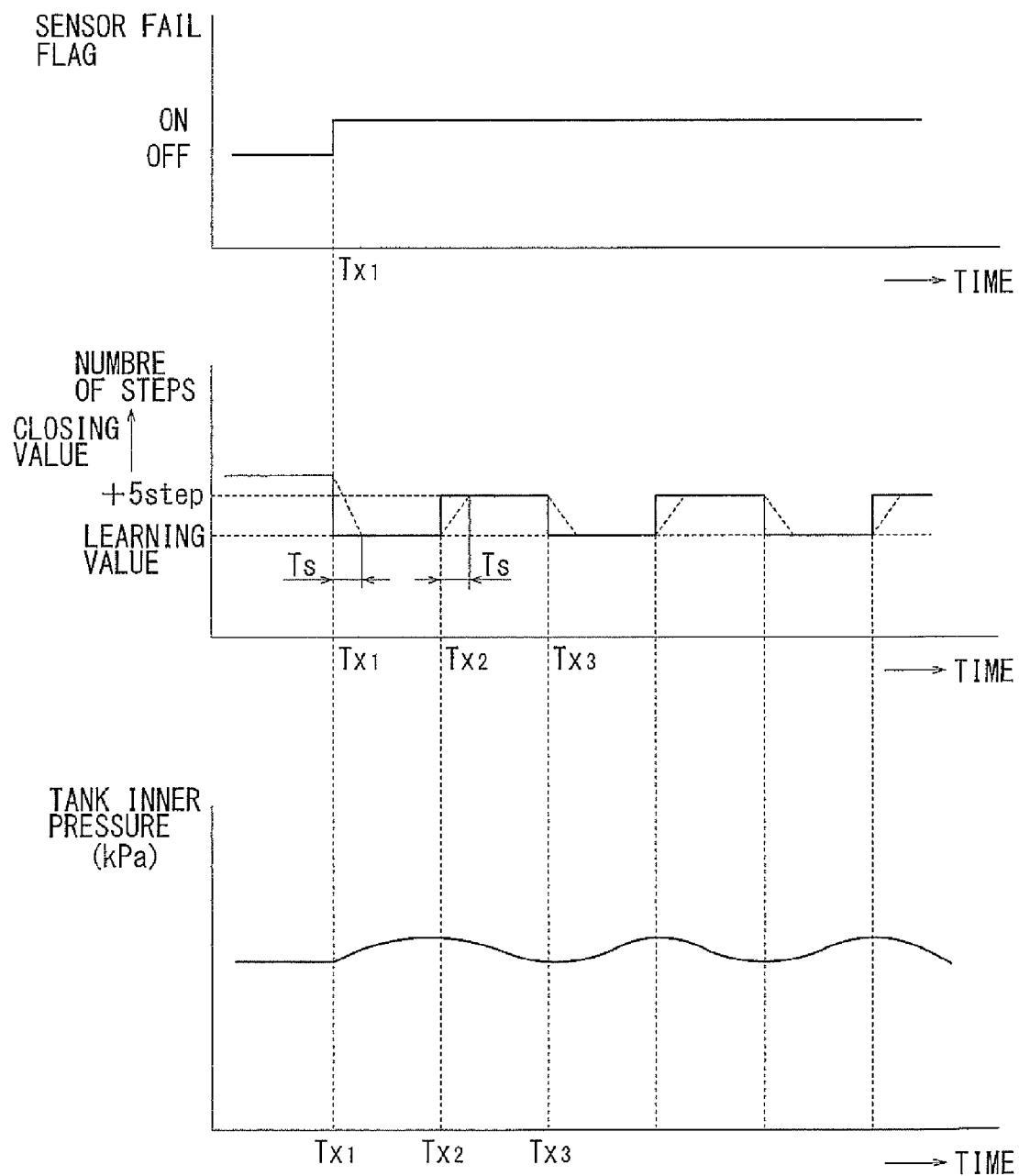
FIG. 7 is a graph illustrating the abnormal state depressurization control.

In this embodiment, as shown by the solid line in FIG. 7, the closing valve 40 is opened and closed by quickly moving between the learning value and the predetermined value (5 steps) apart from the learning value at, for example, time Tx1, Tx2, Tx3, etc. Moreover, in a first modification, as shown by the dotted line in FIG. 7, the closing valve 40 is opened and closed by slowly moving between the learning value and the predetermined value (5 steps) apart from the learning value for Ts time. Thus, for example, because the closing valve 40 is slowly opened from the valve opening start position (the learning value), the vaporized fuel gently flows from the fuel tank 15 into the canister 22 through the vapor path 24, and then is guided from the canister 22 through the purge path 26 and the purge valve 26v into the engine 14. Accordingly, a sudden change of the air-fuel ratio in the engine 14 can be prevented.

Figure 8:
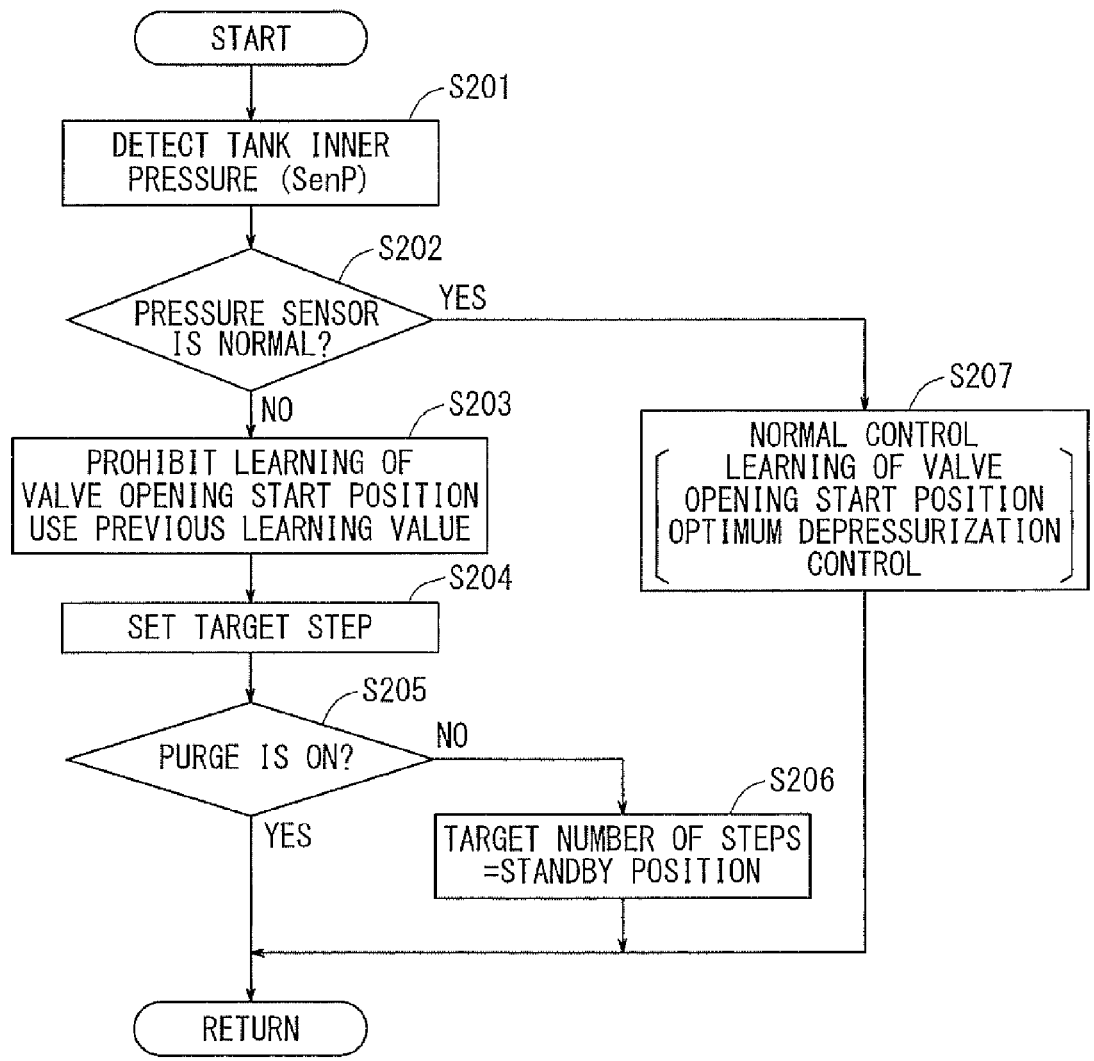
FIG. 8 is a flowchart illustrating the depressurization control of the fuel tank and the abnormal state depressurization control according to a second modification.

Next, the depressurization control and the abnormal state depressurization control of the fuel tank 15 according to a second modification will be described with reference to the flowchart of FIG. 8. In the abnormal state depressurization control according to the first embodiment, the closing valve 40 is intermittently opened in order to depressurize the fuel tank 15. Whereas, in the abnormal state depressurization control of the fuel tank 15 according to the second modification, the closing valve 40 is continuously opened by a predetermined opening ratio in order to depressurize the fuel tank 15. Here, when it is determined that the tank inner pressure sensor 15p is normal, the normal control (step S207 in FIG. 8) is same as the normal control according to the first embodiment (step S109 in FIG. 5). In the second embodiment, when it is determined that the tank inner pressure sensor 15p is abnormal (step S202 in FIG. 8 is NO), the learning control for determining the valve opening start position of the closing valve 40 is prohibited, and the learning value learned while the tank inner pressure sensor 15p is normal, that is, the learning value learned in the last time is used in the abnormal state depressurization control. The target number of steps showing the stroke amount of the closing valve 40 is set at the learning value learned at the last time (step S203). Accordingly, the closing valve 40 is kept in the valve closed state at the valve opening start position. Next, the target number of steps of the closing valve 40 is set at the total value of the learning value at the last time and the predetermined number of steps (step S204 in FIG. 8). In a state that the purge valve 26v of the purge path 26 (refer to FIG. 1) is open (step S205 is YES), the closing valve 40 is moved by the predetermined number of steps from the valve opening start position (the learning value) in order to open the flow path, so that the depressurization of the fuel tank 15 is continuously performed. When the purge valve 26v of the purge path 26 is closed (step S205 is NO), the target number of steps of the closing valve 40 is set at the number of steps in a standby position. Here, the standby position is a position where the stepping motor 50 rotates in the valve closing direction by about 8 steps from the learning value (the number of steps) at the valve opening start position of the closing valve 40. Thus, the closing valve 40 is certainly in the valve closed state, and can be quickly opened when the closing valve 40 receives signals for moving in the valve opening direction. That is, the number of steps at the standby position of the closing valve 40 corresponds to the fail-safe value of this disclosure.

Figure 9:
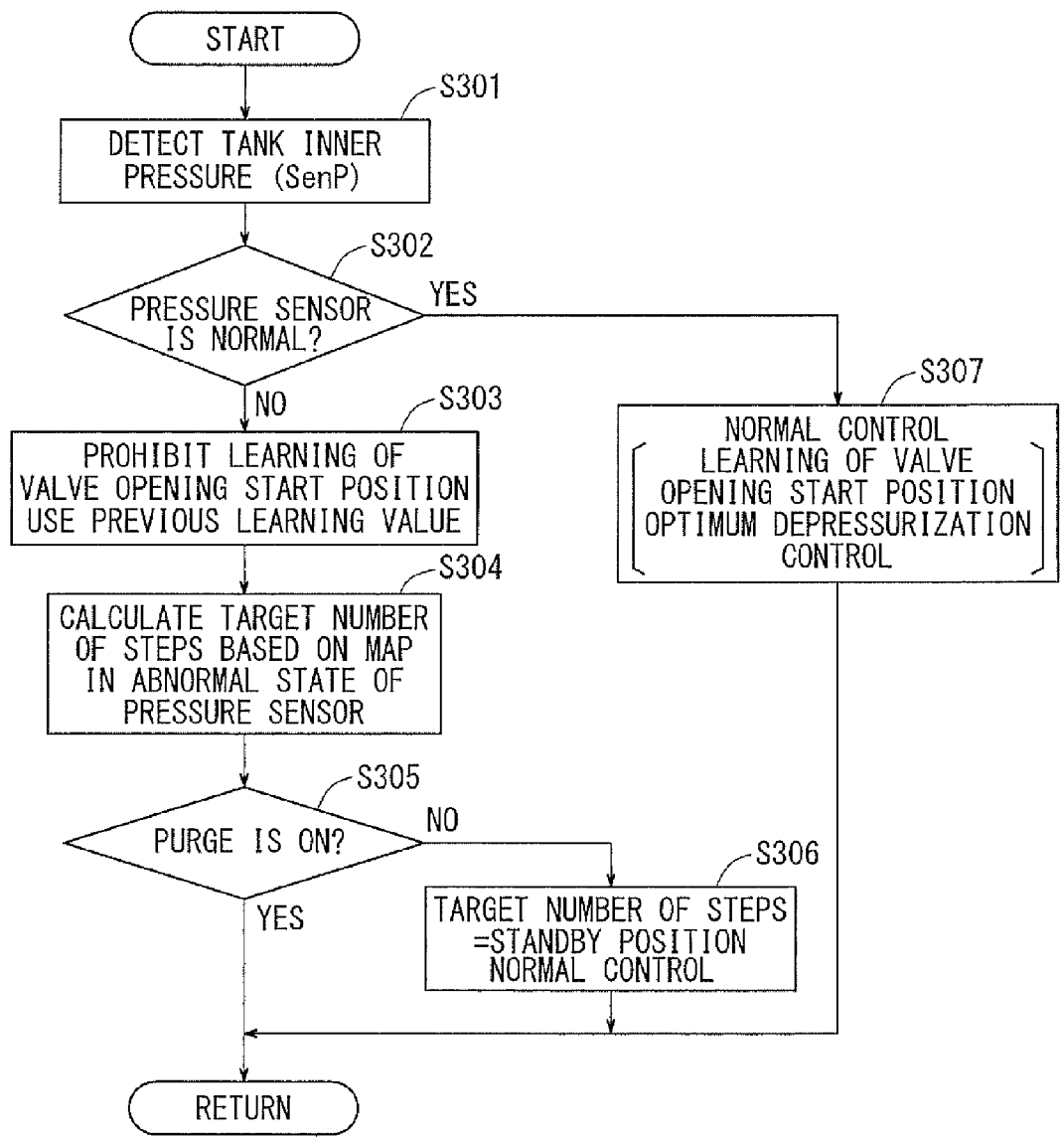
FIG. 9 is a flowchart illustrating the depressurization control of the fuel tank and the abnormal state depressurization control according to a third modification.
Figure 10:
FIG. 10 is a map illustrating target number of steps corresponding to the tank inner pressure and the purge flow amount.

Next, the abnormal state depressurization control of the fuel tank 15 according to a third modification will be described with reference to FIGS. 9 and 10. In the abnormal state depressurization control of the fuel tank 15 according to the second modification, the target number of steps of the closing valve 40 is set at the total value of the learning value in the last time and the predetermined number of steps (refer to step S204 in FIG. 8), and the closing valve 40 is opened by moving it by the target number of steps in order to depressurize the fuel tank 15. Whereas, in the abnormal state depressurization control of the fuel tank 15 according to the third modification, as shown in step S304 in FIG. 9, the target number of steps of the closing valve 40 can be set based on the map in FIG. 10. The map of FIG. 10 is same as the map shown in FIG. 6. In the abnormal state depressurization control of the fuel tank 15 according to the third modification, the number of steps at the maximum value of the tank inner pressure ($P_{12}$) in the map of FIG. 6 (FIG. 9)

is used. For example, when the purge flow amount is L4 (L/sec) (refer to LARGE in FIG. 10), the target number of steps (the stroke amount) of the closing valve 40 is set at α3 step. Thus, when the closing valve 40 is opened by rotating the stepping motor 50 of the closing valve 40 in the valve opening direction by α3 step from the learning value of the valve opening start position, gas in the depressurization flow amount (L/sec) corresponding to the stroke amount (α3 step) flows through the closing valve 40 and the vapor path 24 toward the canister 22, resulting in the depressurization of the fuel tank 15. During this process, because the depressurization flow amount (L/sec) corresponding to the stroke amount (α3 step) is not higher than (i.e., less than or equal to) the purge flow amount L4 (L/sec), the vaporized fuel flowing into the canister 22 from the fuel tank 15 via the vapor path 24 does not remain in the canister 22 but is guided to the engine 14 through the purge path 26 and the purge valve 26v.

Figure 11:
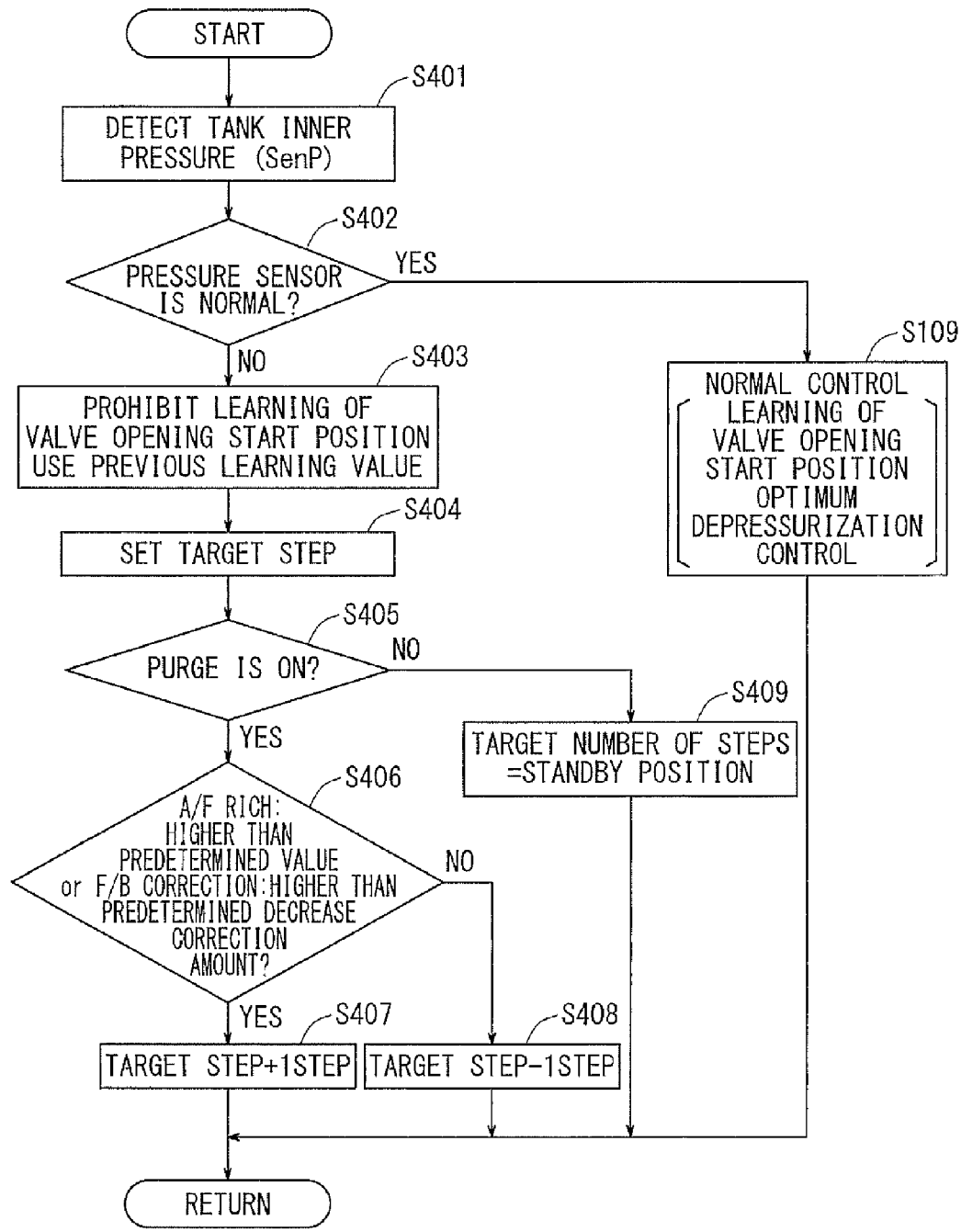
FIG. 11 is a flowchart illustrating the depressurization control of the fuel tank and the abnormal state depressurization control according to a fourth modification.
Figure 12:
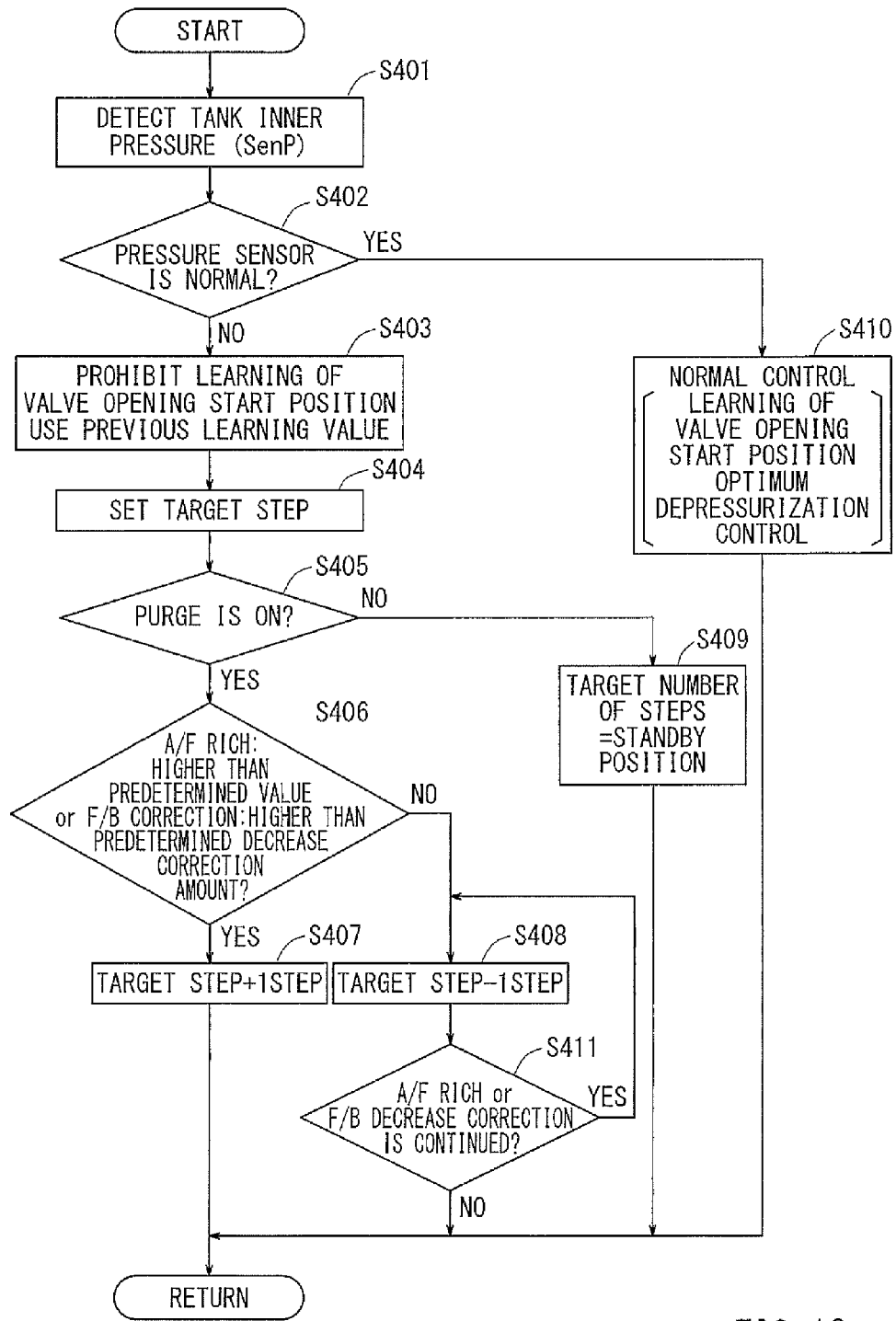
FIG. 12 is a flowchart illustrating an example improvement of the depressurization control of the fuel tank and the abnormal state depressurization control according to the fourth embodiment.

Next, the abnormal state depressurization control of the fuel tank 15 according to a fourth modification will be described in reference to FIGS. 11 and 12. In the abnormal state depressurization control of the fuel tank 15 according to the fourth modification, the target number of steps of the closing valve 40 in the abnormal state depressurization control according to the second modification can be corrected based on the air-fuel ratio (A/F) of the engine 14 or a feedback signal (F/B) of the air-fuel ratio. That is, in the abnormal state depressurization control of the fuel tank 15 according to the fourth modification, as shown in the flowchart of FIG. 11, the target number of steps of the closing valve 40 is set at the total value of the learning value in the last time and the predetermined steps (step S404 in FIG. 11), and then it is determined whether the purge valve 26v of the purge path 26 (refer to FIG. 1) is open or not (step S405). When the purge valve 26v of the purge path 26 is open (step S405 is YES), it is determined whether the air-fuel ratio in the engine 14 is in a normal range or not (step S406). For example, when the air-fuel ratio (A/F) in the engine 14 is richer than a predetermined value or when it is corrected to be decreased based on the feedback signal (F/B) for the air-fuel ratio in the engine 14 by not less than (i.e., greater than or equal to) a predetermined amount (step S406 is NO), the total value of the learning value and the predetermined steps, which has been set in step S404, is decreased by 1 step (step S408). Thus, the opening amount of the closing valve 40 is decreased by 1 step, so that the amount of the vaporized fuel guided from the fuel tank 15 to the engine 14 through the vapor path 24, the canister 22, the purge path 26 and the purge valve 26v is decreased. As a result, the air-fuel ratio in the engine 14 is returned to the normal condition. When the air-fuel ratio (A/F) in the engine 14 is not richer than the predetermined value or when it is not corrected to be decreased based on the feedback signal (F/B) for the air-fuel ratio in the engine 14 by not less than (i.e., greater than or equal to) the predetermined amount (step S406 is YES), the total value of the leaning value and the predetermined steps, which has been set in step S404, is increased by 1 step (step S407). Thus, the opening amount of the closing valve 40 is increased by 1 step, so that the amount of the vaporized fuel guided from the fuel tank 15 to the engine 14 through the vapor path 24, the canister 22, the purge path 26 and the purge valve 26v is increased. Here, as shown in the flowchart of FIG. 12, after decreasing the target step (the learning value+the predetermined steps) by 1 step in step S408, a process for determining whether the air-fuel ratio (A/F) in the engine 14 is rich or not (step S411) can be added. Due to this, for example, in a state that the air-fuel ratio (A/F) in the engine 14 is richer than the predetermined value (step S406 is NO), when the air-fuel ratio (A/F) is still rich after performing the decrease operation (step S408) once, the decrease operation of step S408 can be repeated.

According to the vaporized fuel processing apparatus 20 of this embodiment, when the inner pressure of the fuel tank 15 cannot be detected, the stroke amount of the closing valve 40 is set at the fail-safe value (e.g., the learning value or the standby value) in which the closing valve 40 is closed, and then the stroke amount is changed in the valve opening direction of the closing valve 40 from the fail-safe value in order to perform the abnormal state depressurization control of the fuel tank 15. Thus, if the inner pressure of the fuel tank 15 cannot be detected, the depressurization of the fuel tank 15 can be performed. Further, because the depressurization of the fuel tank 15 can be performed intermittently, the vaporized fuel flowing into the canister 22 from the fuel tank 15 through the vapor path 24 can be prevented from leaking into the atmosphere. Further, the closing valve 40 can be slowly opened, the vaporized fuel gently flows from the fuel tank 15 into the canister 22 via the vapor path 24 and is guided to the intake path 16 of the engine 14 through the purge path 26. Accordingly, the air-fuel ratio in the engine 14 is unlikely to be rich suddenly. Further, in the abnormal state depressurization control of the fuel tank 15, after the stroke amount is set at the fail-safe value (e.g., the leaning value or the standby value), in which the closing valve 40 is closed, the stroke amount is maintained at the predetermined value, in which the closing valve 40 is open, in order to continuously perform the depressurization of the fuel tank. Accordingly, if the inner pressure of the fuel tank 15 is high, the depressurization can be performed appropriately.

In the abnormal state depressurization control, because the closing valve 40 is opened based on the standard stroke amount of the closing valve 40 corresponding to the maximum value of the inner pressure of the fuel tank 15 and the purge flow amount, the amount of gas flowing into the canister 22 from the fuel tank 15 through the vapor path 24 is not higher than (i.e., less than or equal to) the purge flow amount. Thus, leakage of the vaporized fuel from the canister 22 into the atmosphere can be prevented. Further, in the abnormal state depressurization control of the fuel tank 15, the stroke amount of the closing valve 40 is maintained at the fail-safe value (e.g., the learning value or the standby value) while the purge path 26 is closed, and when the purge path 26 is opened, the stroke amount of the closing valve 40 is changed in the valve opening direction in order to perform the depressurization of the fuel tank 15. That is, while the canister 22 is not purged, the closing valve 40 is closed such that the depressurization of the fuel tank 15 is not performed. Thus, the vaporized fuel remains in the canister 22 and is prevented from leaking into the atmosphere. Further, the target number of steps of the closing valve 40 can be corrected based on the air-fuel ratio in the engine 14, so that disturbance of the air-fuel ratio in the engine 14 can be prevented.

Figure 13:
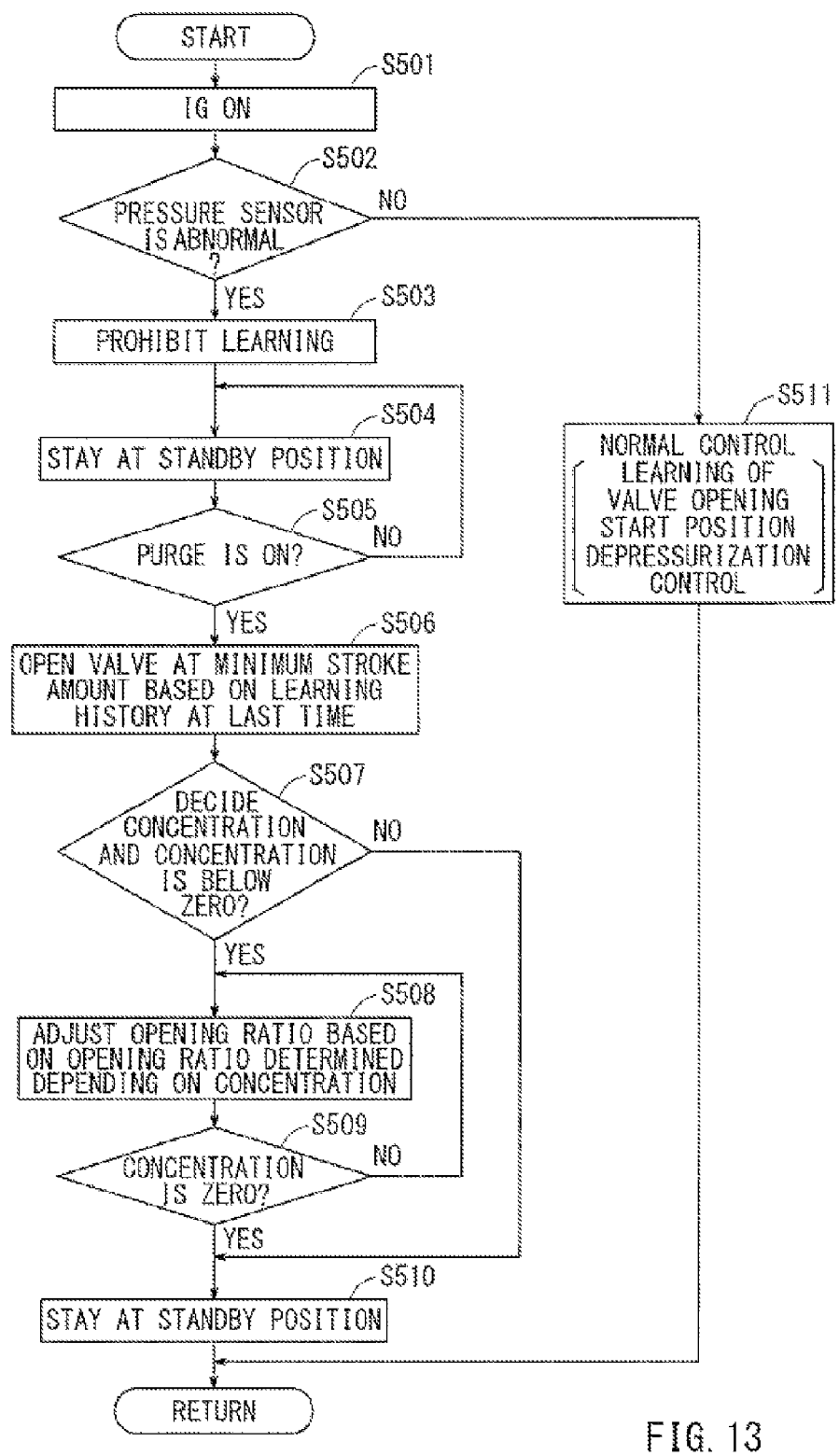
FIG. 13 is a flowchart illustrating the depressurization control of the fuel tank and first and second abnormal state depressurization controls according to a second embodiment.

Next, the vaporized fuel processing apparatus 20 according to a second embodiment of this disclosure with reference to FIGS. 13-20. In the first embodiment, when the tank inner pressure sensor 15p is in the abnormal condition, the abnormal state depressurization control is performed without relation to the tank inner pressure or on the assumption that the tank inner pressure is maximum. Whereas, in the second embodiment, the abnormal state depressurization control is performed while using a concentration sensor for the vaporized fuel instead of the tank inner pressure sensor 15p. Here, the normal control in the state that the tank inner pressure sensor 15p is in the normal condition in the second embodiment is the same with that in the first embodiment, and thus it will not be described repeatedly. The flowchart of FIG. 13 shows the abnormal state depressurization control of the vaporized fuel processing apparatus 20 according to the second embodiment, and the abnormal state depressurization control is repeatedly performed based on a program stored in the storage unit of the ECU 19.

Figure 14:
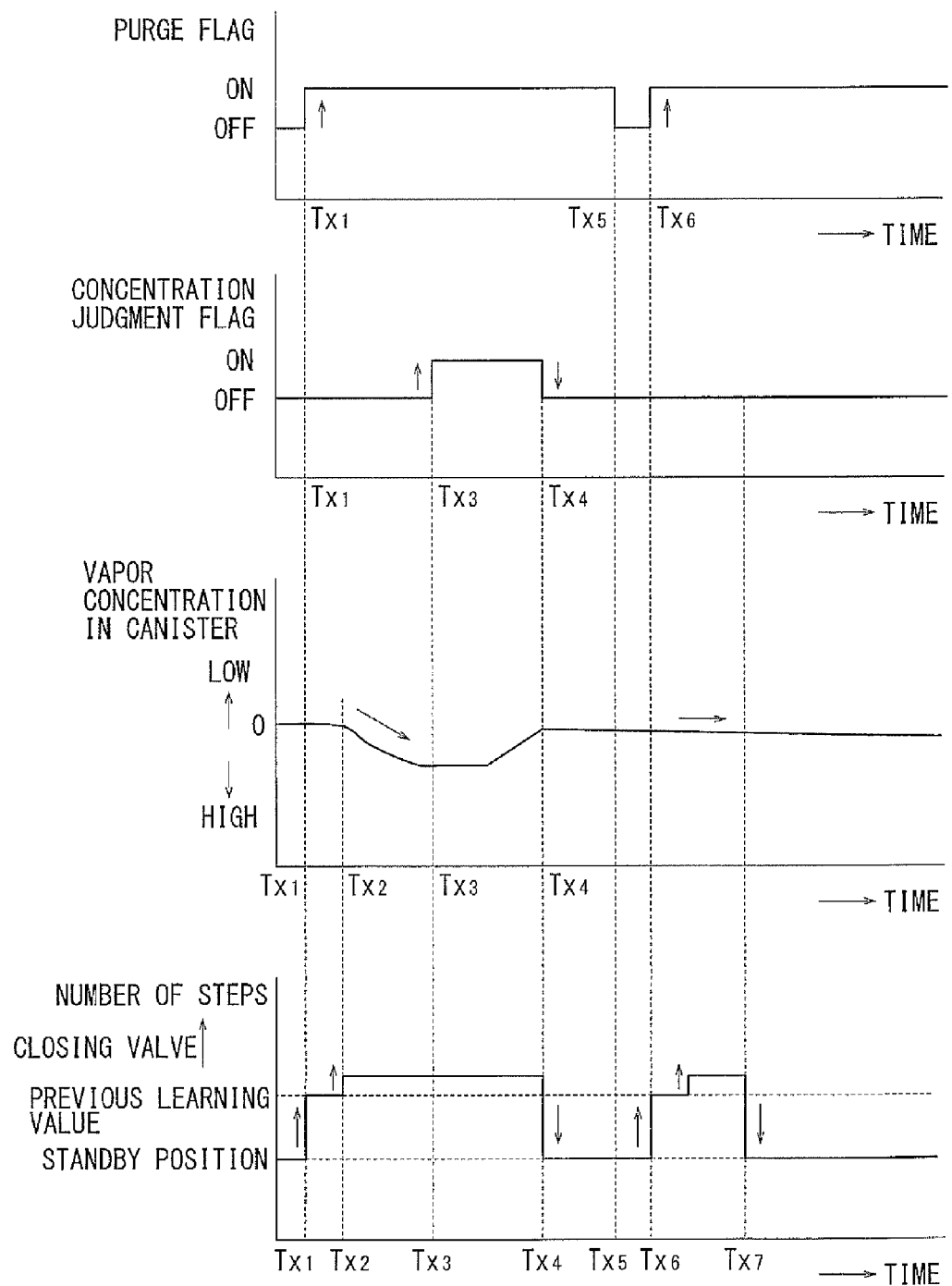
FIG. 14 is a graph illustrating the first abnormal state depressurization control in the vaporized fuel processing apparatus according to the second embodiment.
Figure 15:
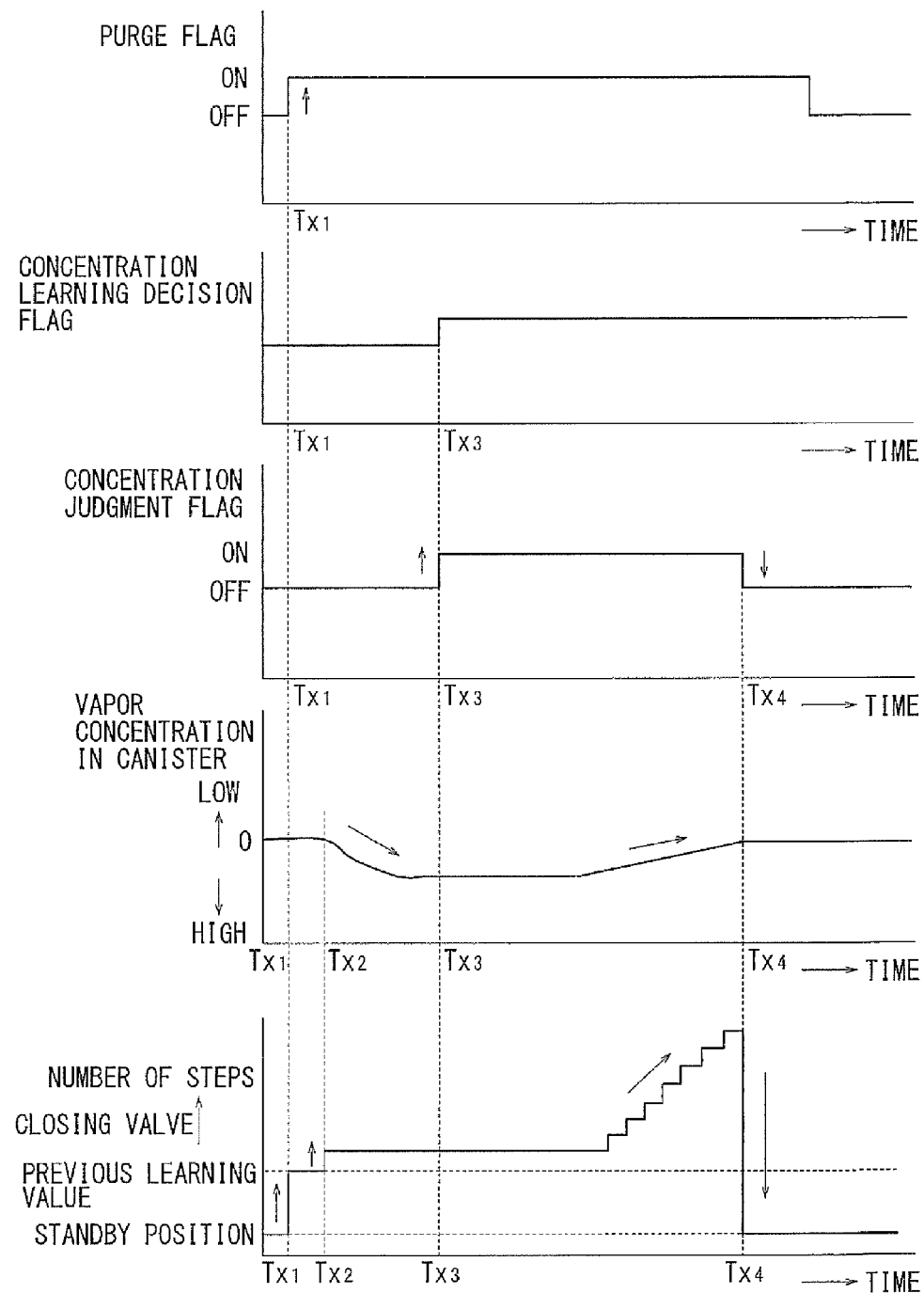
FIG. 15 is a graph illustrating the second abnormal state depressurization control.

In the abnormal state depressurization of the fuel tank 15 according to the second embodiment of this disclosure, when the ignition switch is turned on such that an abnormality of the tank inner pressure sensor 15p is detected (step S501 in FIG. 13, step S502 is YES), the learning control of the valve opening start position of the closing valve 40 is prohibited (step S503). The target number of steps showing the stroke amount of the closing valve 40 is set at the number of steps at the standby position (standby value). That is, the closing valve 40 stays at the standby position that is the valve closing position (step S504). In this state, as shown at time Tx1 in FIGS. 14 and 15, when the purge flag is on and the purge valve 26v of the purge path 26 is opened (step S505 in FIG. 13 is YES), the number of steps of the closing valve 40 is set at the learning value in the last time, and then it is increased by the predetermined number of steps. Due to this, the closing valve 40 is opened at a minimum stroke amount (step S506, refer to time Tx2 in FIGS. 14 and 15). In this way, the depressurization of the fuel tank 15 is performed by opening the closing valve 40 at the minimum stroke amount such that the vaporized fuel flows from the fuel tank 15 into the canister 22 through the vapor path 24. As a result, as shown in FIGS. 14 and 15, the concentration of the vaporized fuel (hereafter referred to as vapor concentration) in the canister 22 gradually increases. Here, the vapor concentration in the canister 22 can be calculated based on the air-fuel ratio (A/F) in the engine 14 by the ECU 19 and can be detected by using a concentration sensor 22c provided in the canister 22. Further, the temperature of the adsorbent A loaded in the canister 22 is detected by a temperature sensor 22t, and the vapor concentration can be calculated by the ECU 19 based on signals from the temperature sensor 22t. That is, the concentration sensor 22c, the temperature sensor 22t or the like correspond to a concentration detector of this disclosure.

In this way, as shown at time Tx3 in FIGS. 14 and 15, when the vapor concentration in the canister 22 is higher than a predetermined concentration due to continuation of the depressurization of the fuel tank 15 and when the concentration judgment flag is on (step S507 in FIG. 13 is YES), the stroke amount (the number of steps) of the closing valve 40 is adjusted to a value that is determined based on the concentration (step S508). In a method shown in FIG. 14, the stroke amount (the number of steps) of the closing valve 40, which is determined based on the concentration, is set at the minimum stroke amount in which the closing valve 40 is opened. Thus, if the concentration judgment flag is on, the stroke amount (the number of steps) does not change, and the closing valve 40 is continuously open at the minimum stroke amount. In this way, when the depressurization of the fuel tank 15 is continued, the amount of the vaporized fuel guided from the fuel tank 15 through the vapor path 24, the canister 22, the purge path 26 and the purge valve 26 into the engine 14 starts to decreases over time. Then, when the tank inner pressure of the fuel tank 15 is within the acceptable range and the depressurization of the fuel tank 15 is completed, the vapor concentration in the canister 22 is approximately zero, so that the concentration judgment flag is off (time Tx4 in FIG. 14). As a result, S509 in FIG. 13 is YES, the stroke amount (the number of steps) of the closing valve 40 is set at the standby value (step S510), and the closing valve 40 is kept at the standby position that is the valve closing position.

Figures 18, 19:
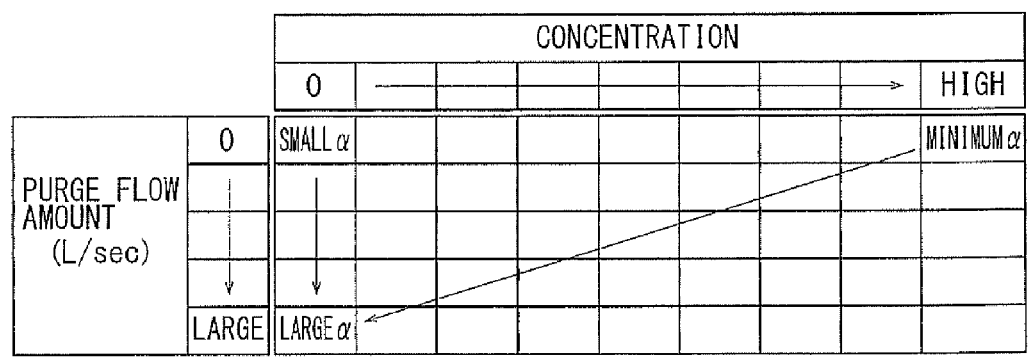
FIG. 18 is a map illustrating relationship between a concentration of the vaporized fuel in the canister and the number of steps of the closing valve.
FIG. 19 is a map illustrating relationship between the concentration of the vaporized fuel in the canister, the purge flow amount and the number of steps of the closing valve.

In a method shown in FIG. 15, the stroke amount (the number of steps) of the closing valve 40, that is determined based on the concentration, is set based on the map of FIG. 18. That is, the stroke amount (the number of steps) of the closing valve 40 is set at a small value in a state that the vapor concentration is high, and the stroke amount (the number of steps) becomes larger as the vapor concentration goes to zero (refer to a lower portion of FIG. 15). Thus, as the vapor concentration goes to zero by continuing the depressurization of the fuel tank 15, the stroke amount (the number of steps) of the closing valve 40 becomes large, and the opening ratio of the closing valve 40 increases. When the tank inner pressure of the fuel tank 15 is within the acceptable range and the concentration judgment flag is off (time Tx4 in FIG. 15), step S509 in FIG. 13 is YES, and the closing valve 40 is kept at the standby position that is the valve closing position (step S510). In this way, when the abnormal state depressurization of the fuel tank 15 is completed, when the purge flag is on at time Tx5 in FIG. 14 such that the purge valve 26v of the purge 26 is closed, and then when the purge flag is on again (time Tx6 in FIG. 14, step S505 in FIG. 13 is YES), the number of steps of the closing valve 40 is set at the learning value at the last time, and then the closing valve 40 is opened at the minimum stroke amount (step S506). When the vapor concentration in the canister 22 remains at approximately zero (step S507 in FIG. 13 is NO), the closing valve 40 is returned to the standby position (step S510 in FIG. 13, time Tx7 in FIG. 14).

Figure 16:
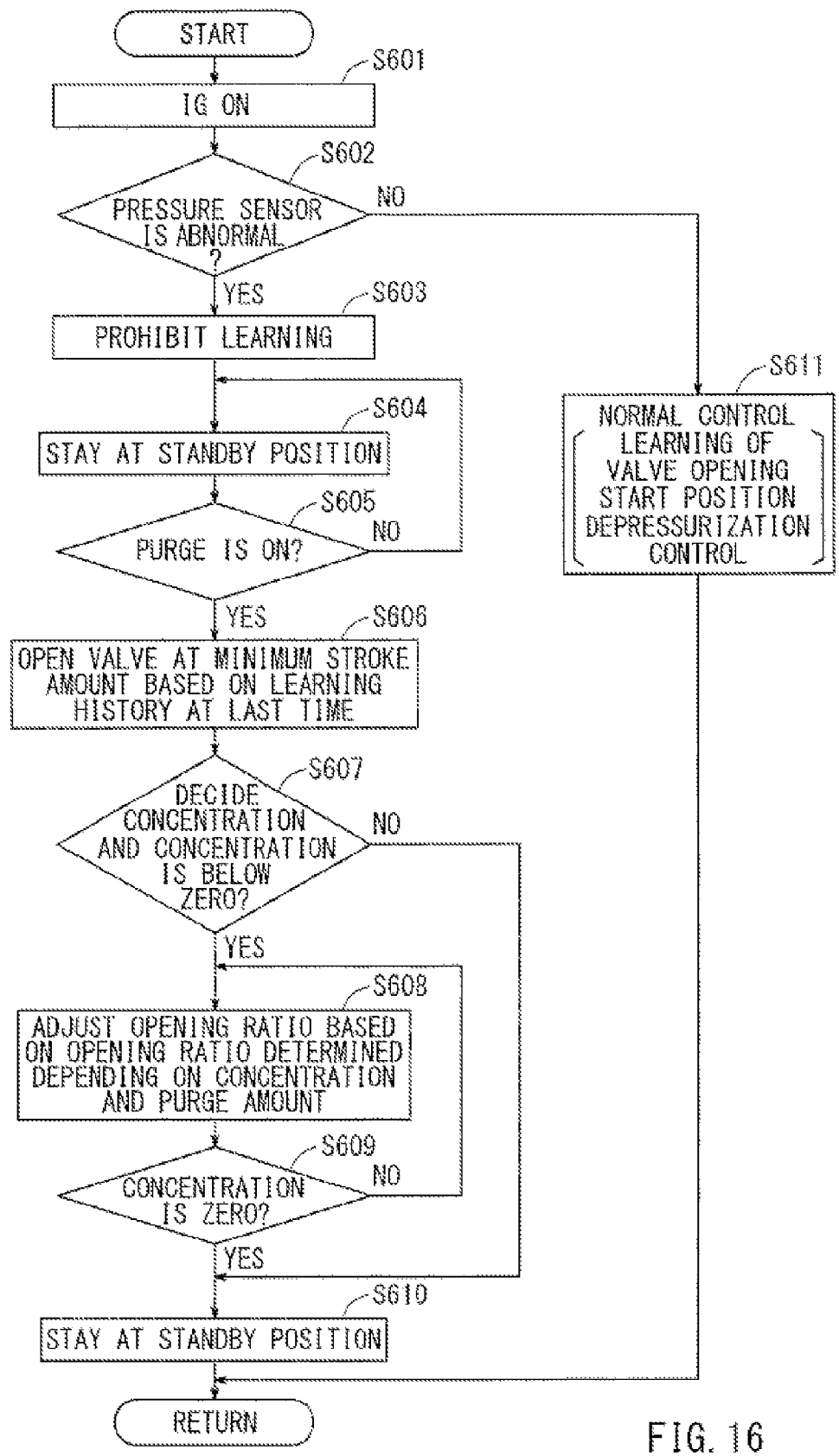
FIG. 16 is a flowchart illustrating the depressurization control of the closing valve and the abnormal state depressurization control according to a fifth modification.
Figure 17:
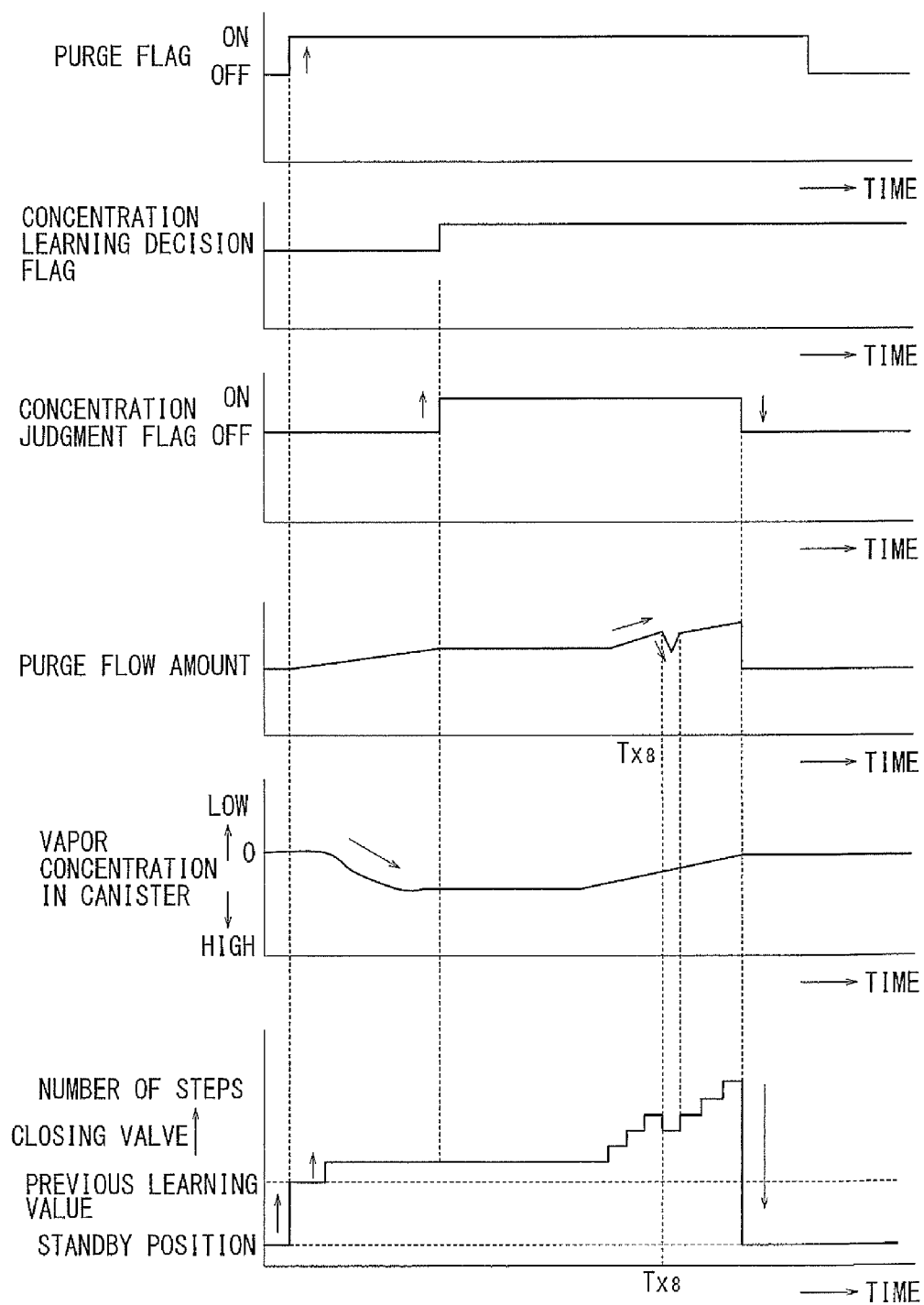
FIG. 17 is a graph illustrating the abnormal state depressurization control according to the fifth modification.

Next, the abnormal state depressurization control of the fuel tank 15 according to a fifth modification will be described with reference to FIGS. 16 and 17. In the abnormal state depressurization control of the fuel tank 15 according to the second embodiment (refer to FIG. 15), the stroke amount (the number of steps) of the closing valve 40 depending on the vapor concentration in the canister 22 is set based on the map of FIG. 18. Whereas, in the abnormal state depressurization according to the fifth modification, the stroke amount (the number of steps) of the closing valve 40 corresponding to the vapor concentration in the canister 22 is set based on the map of FIG. 19 (step S608 in FIG. 16). That is, in the map of FIG. 19, the standard stroke amount (a) of the closing valve 40 corresponding to the vapor concentration in the canister 22 and the purge flow amount (L/sec). In a state that the closing valve 40 is opened at the standard stroke amount (α step), the flow amount through the closing valve 40 (depressurization flow amount L/sec) is set to be not larger than (i.e., less than or equal to) the purge flow amount (L/sec). Here, each of the standard stroke amounts (α step) shown in the map of FIG. 19 is the number of steps in a state that the learning value of the closing valve 40 is set as 0 step. Thus, in a state that the purge flow amount (L/sec) suddenly decreases as shown at time Tx8 in FIG. 17, even when the vapor concentration in the canister 22 does not change, the standard stroke amount (α) of the closing valve 40 decreases depending on the purge flow amount (L/sec), so that the opening ratio (the number of steps) of the closing valve 40 decreases. Due to this, even when the purge flow amount (L/sec) suddenly decreases, the flow amount through the closing valve 40 (the depressurization flow amount L/sec) is not larger than (i.e., less than or equal to) the purge flow amount (L/sec), so that the vaporized fuel is not likely to remain in the canister 22. As a result, leakage of the vaporized fuel into the atmosphere can certainly be prevented.

Next, the abnormal state depressurization control of the fuel tank 15 according to a sixth modification will be described with reference to FIG. 20. In the abnormal state depressurization controls shown in FIGS. 14, 15 and 17, when the concentration judgment flag is on in the state that the vapor concentration in the canister 22 is low (time Tx4 in FIGS. 14 and 15), the closing valve 40 is changed to the standby position in order to stop the depressurization of the fuel tank 15 (refer to step S510 in FIG. 13). Whereas, in the abnormal state depressurization control of the fuel tank 15 according to the sixth modification, in a condition that the vapor concentration flag is on and that, e.g., the air-fuel ratio (A/F) in the engine 14 is in a stable range over a predetermined time, the closing valve 40 is operated to the standby position that is the valve closing position. That is, in the abnormal state depressurization control of the fuel tank 15 according to the sixth modification, the air-fuel ratio (A/F) in the engine 14 and the feedback signal (F/B) for the air-fuel ratio from the control device (the ECU 19) are monitored while monitoring the vapor concentration in the canister 22. In a condition that the concentration judgment flag showing the vapor concentration in the canister 22 is on as shown at time Tx4 in FIG. 20 and then each of the air-fuel ratio (A/F) in the engine 14 and the feedback signal (F/B) for the air-fuel ratio is in the stable range over the predetermined time as shown at time Tx40 in FIG. 20, the closing valve 40 is operated to the standby position that is the valve closing position.

Figure 20:
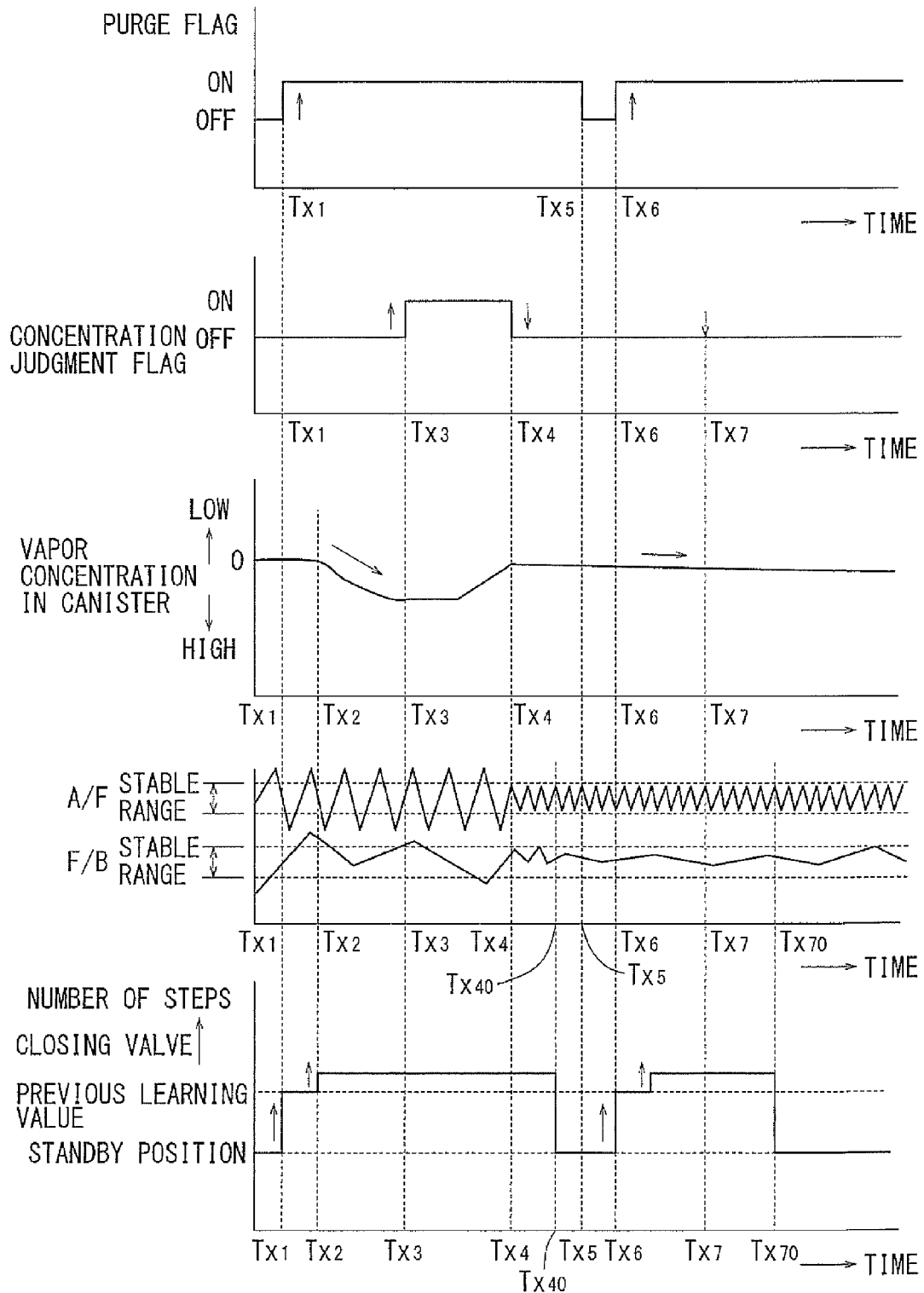
FIG. 20 is a graph illustrating the abnormal state depressurization control according to a sixth modification.

As shown in FIG. 20, when the purge flag is off at time Tx5 such that the purge valve 26v of the purge path 26 is closed and then the purge flag is turned on (time Tx6 in FIG. 20), the number of steps of the closing valve 40 is set at the learning value at the last time, and then the closing valve 40 is opened at the minimum stroke amount. When it is determined that the vapor concentration in the canister 22 is approximately zero (time Tx7 in FIG. 20) and then the air-fuel ratio (A/F) in the engine 14, etc. is in the stable range over the predetermined time, the closing valve 40 is operated to the standby position that is valve closing position. Thus, in the abnormal state depressurization control of the fuel tank 15 according to the sixth modification, for example, when the air-fuel ratio (A/F) in the engine 14, etc. is not stable in a state that the vapor concentration in the canister 22 is low, the depressurization of the fuel tank can be continued.

According to the vaporized fuel processing apparatus 20 according to this embodiment, in the abnormal state depressurization control of the fuel tank 15, when the vapor concentration detected by the concentration detector is lower than a standard value, the stroke amount of the closing valve 40 is maintained at the standby value (fail-safe value). When the vapor concentration in the canister 22 increases after start of the depressurization of the fuel tank 15 and then the inner pressure of the fuel tank 15 decreases while continuing the depressurization, the vapor concentration in the canister 22 decreases. Thus, even if the inner pressure of the fuel tank 15 cannot be detected, the depressurization control of the fuel tank 15 can be performed by using the concentration detector. Further, for example, when the air-fuel ratio in the engine 14, etc. is not stable in the state that the vapor concentration in the canister 22 is low, the depressurization of the fuel tank 15 can be continued.

Figure 21:
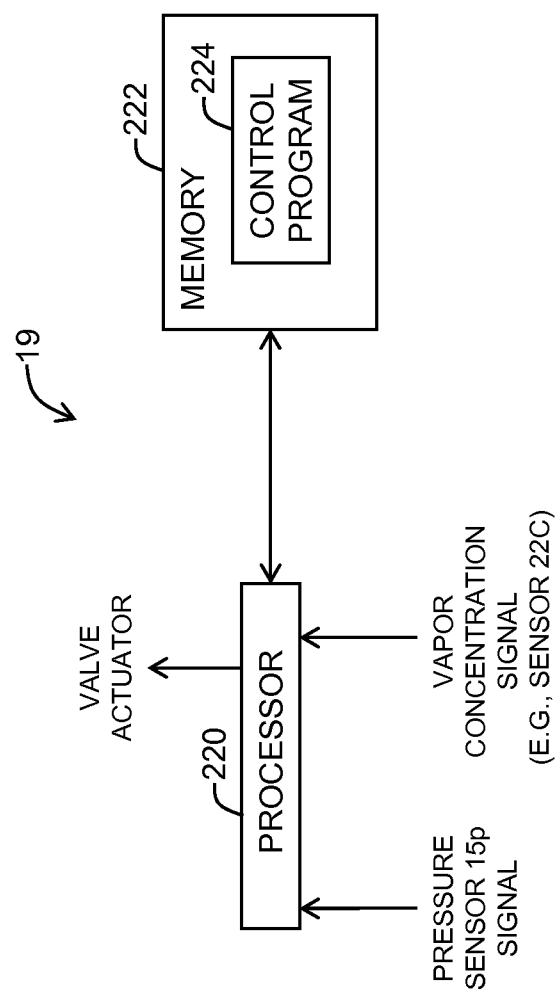
FIG. 21 is a block diagram of an example of a controller to perform an abnormal state depressurization control as disclosed herein.

FIG. 21 shows an example of the ECU 19. In this example, the ECU 19 includes a processor 220 coupled to memory 222. Memory 222 includes a control program 224 which is executable by the processor 220. When the control program 224 is executed, the processor 220 performs any or all of the various functions described herein as attributed to the ECU 19.

For example, the control program 224 may cause the processor 220 to perform a depressurization control of the fluid tank 15 by adjusting an amount of gas flowing along the vapor path 24 by changing a stroke amount of the movable valve member (e.g., valve guide 60) of a closing valve (e.g., valve 40) based on the inner pressure of fuel tank 15 (e.g., as detected by sensor 15p) when the inner pressure is detectable by sensor 15p in accordance with the principles disclosed herein. In addition, the control program 224 may cause the processor 220 to perform a depressurization control of the fluid tank by setting the stroke amount of the closing valve at a fail-safe value, in which the closing valve is closed, and thereafter changing the stroke amount of the movable valve member (e.g., valve guide 60) in a valve opening direction from the fail-safe value when the inner pressure of the fuel tank is not detectable by pressure sensor 15p in accordance with the principles disclosed herein.

The present disclosure can be further modified without departing from the scope of the invention. For example, in the abnormal state depressurization controls of the second embodiment shown in FIGS. 14, 15, 17 and 20, when the depressurization of the fuel tank 15 is completed, the closing valve 40 is maintained to the standby position in order to close it. However, in a state that the purge flag is on, even when the depressurization of the fuel tank 15 is completed, the closing valve 40 is not returned to the standby position in order to keep it in the valve opening state. Further, the stepping motor 50 is used as a motor of the closing valve 40 in this embodiment, a DC motor or the like can be used instead of the stepping motor 50. It should be appreciated that the stroke amount described herein can be decided and/or detected based on, for example, a value detected by a stroke sensor, or, in embodiments which utilize a stepping motor (e.g., motor 50) the number of steps of the stepping motor.

The invention claimed is:

1. A vaporized fuel processing apparatus comprising:
    a canister loaded with an adsorbent capable of adsorbing vaporized fuel generated in a fuel tank;
    a vapor path conduit extending between the canister and the fuel tank;
    a closing valve provided along the vapor path conduit and having an electric motor, a valve seat, and a valve movable portion, wherein the valve movable portion includes an axis and wherein the electric motor is configured to move the valve movable portion in an axial direction with respect to the valve seat;
    a pressure sensor configured to detect inner pressure of the fuel tank; and
    an electric control unit to:
    actuate the electric motor to change a stroke amount, which is an axial distance of the valve movable portion from the valve seat, to one of a plurality non-zero values to adjust an amount of gas flowing through the vapor path conduit, based on the inner pressure of the fuel tank to perform a depressurization control of the fuel tank when the pressure sensor is able to detect the inner pressure of the fuel tank; and
    actuate the electric motor to set the stroke amount at a fail-safe value, in which the closing valve is closed, and thereafter actuate the electric motor to change the stroke amount in a valve opening direction of the closing valve from the fail-safe value to perform abnormal state depressurization control of the fuel tank when the pressure sensor cannot detect the inner pressure of the fuel tank.

2. The vaporized fuel processing apparatus according to claim 1, wherein the electric control unit is to alternately and repeatedly:
    actuate the electric motor to maintain the stroke amount at the fail-safe value; and
    actuate the electric motor to maintain the stroke amount at a predetermined value in which the closing valve is open in order to intermittently depressurize the fuel tank when the pressure sensor cannot detect the inner pressure of the fuel tank.

3. The vaporized fuel processing apparatus according to claim 2,
    wherein the electric control unit is to actuate the electric motor to change the stroke amount between the fail-safe value and the predetermined value over a predetermined time.

4. The vaporized fuel processing apparatus according to claim 1,
    wherein the electric control unit is to actuate the electric motor to set the stroke amount at the fail-safe value, and then actuate the electric motor to maintain the stroke amount at a predetermined value in which the closing valve is open in order to continuously depressurize the fuel tank when the pressure sensor cannot detect the inner pressure of the fuel tank.

5. The vaporized fuel processing apparatus according to claim 1,
    wherein the electric control unit is to actuate the electric motor to open the closing valve based on standard stroke amounts of the closing valve, wherein each of the standard stroke amounts has been set based on a corresponding combination of the inner pressure of the fuel tank and a purge flow amount, which is the amount of gas flowing through a purge path when the pressure sensor is able to detect the inner pressure of the fuel tank, and
    wherein the electric control unit is to actuate the electric motor to open the closing valve based on one of the standard stroke amounts of the closing valve that corresponds to both a maximum inner pressure of the fuel tank and the purge flow amount among the previously set standard stroke amounts of the closing valve when the pressure sensor cannot detect the inner pressure of the fuel tank.

6. The vaporized fuel processing apparatus according to claim 5,
    wherein the electric control unit is to store a map of the standard stroke amounts corresponding to both the inner pressures of the fuel tank, which are divided at predetermined intervals, and the purge flow amounts divided at predetermined intervals, and
    wherein the electric control unit is actuate the electric motor to perform the abnormal state depressurization control of the fuel tank based on the map of the standard stroke amounts.

7. The vaporized fuel processing apparatus according to claim 1,
    wherein the electric control unit is to actuate the electric motor to maintain the stroke amount at the fail-safe value when a purge path is closed, and to actuate the electric motor to change the stroke amount in the valve opening direction when the purge path is open in order to depressurize the fuel tank when the pressure sensor cannot detect the inner pressure of the fuel tank.

8. The vaporized fuel processing apparatus according to claim 1, further comprising
a concentration detector configured to detect a concentration of the vaporized fuel in the canister;
wherein the electric control unit is to actuate the electric motor to adjust the stroke amount at opening the closing valve based on the concentration of the vaporized fuel in the canister detected by the concentration detector.

9. The vaporized fuel processing apparatus according to claim 8,
wherein the electric control unit is to actuate the electric motor to maintain the stroke amount of the closing valve at the fail-safe value when the concentration of the vaporized fuel detected by the concentration detector is lower than a predetermined standard value and when the pressure sensor cannot detect the inner pressure of the fuel tank.

10. The vaporized fuel processing apparatus according to claim 8,
wherein the electric control unit is to calculate an air-fuel ratio in an engine and compare the air fuel ratio with a predetermined stable range; and
wherein the electric control unit is to actuate the electric motor to maintain the stroke amount of the closing valve at the fail-safe value when the concentration of the vaporized fuel detected by the concentration detector is lower than a predetermined value, when the air-fuel ratio in the engine is in the predetermined stable range, and when the pressure sensor cannot detect the inner pressure of the fuel tank.

11. The vaporized fuel processing apparatus according to claim 8,
wherein the electric control unit is to determine an air-fuel ratio in an engine; and
wherein the concentration detector is to calculate the concentration of the vaporized fuel in the canister based on the air-fuel ratio in the engine.

12. The vaporized fuel processing apparatus according to claim 8, further comprising
a temperature sensor configured to detect a temperature of the adsorbent in the canister; and
wherein the electric control unit is to calculate the concentration of the vaporized fuel in the canister based on the temperature of the adsorbent detected by the temperature sensor.

13. The vaporized fuel processing apparatus according to claim 1,
wherein when the stroke amount is in a predetermined range from zero, the closing valve is maintained in the valve closing state capable of maintaining the fuel tank in a hermetic state, and
wherein the fail-safe value corresponds to a first stroke amount, in which the closing valve in the valve closing state and is ready to open, or a second stroke amount changed in the valve closing direction from the first stroke amount.

14. A fuel vapor control device, comprising:
memory containing a control program; and
a processor coupled to the memory and configured to execute the control program;
wherein, upon executing the control program the processor is to:
actuate an electric motor to change a stroke amount of a closing valve, which is an axial distance of a valve movable member of the closing valve from a valve seat, to one of a plurality of non-zero values to adjust an amount of gas flowing through a vapor path conduit extending between a canister and a fuel tank, based on the inner pressure of the fuel tank when an inner pressure of the fuel tank is detectable; and
actuate the electric motor to set the stroke amount at a fail-safe value, in which the closing valve is closed, and thereafter actuate the electric motor to change the stroke amount in a valve opening direction of the closing valve from the fail-safe value when the inner pressure of the fuel tank is not detectable.

15. The vaporized fuel processing apparatus according to claim 1, wherein all flow through the closing valve is controlled by movement of the valve movable portion.

* * * * *